United States Patent
Chen et al.

(10) Patent No.: US 10,036,873 B2
(45) Date of Patent: Jul. 31, 2018

(54) OPTICAL IMAGING LENS, IMAGE CAPTURING APPARATUS AND ELECTRONIC DEVICE

(71) Applicant: LARGAN PRECISION CO., LTD., Taichung (TW)

(72) Inventors: Chun-Yen Chen, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 15/228,394

(22) Filed: Aug. 4, 2016

(65) Prior Publication Data
US 2017/0336602 A1 Nov. 23, 2017

(30) Foreign Application Priority Data
May 20, 2016 (TW) .............................. 105115692 A

(51) Int. Cl.
G02B 3/02 (2006.01)
G02B 13/00 (2006.01)
G02B 1/04 (2006.01)
G02B 5/00 (2006.01)
G02B 5/20 (2006.01)
G02B 9/62 (2006.01)

(52) U.S. Cl.
CPC .......... *G02B 13/0045* (2013.01); *G02B 1/04* (2013.01); *G02B 5/005* (2013.01); *G02B 5/208* (2013.01); *G02B 9/62* (2013.01)

(58) Field of Classification Search
CPC ................................................ G02B 13/0045
USPC ......................................................... 359/713
See application file for complete search history.

(56) References Cited

U.S. PATENT DOCUMENTS

| 8,760,774 B2 | 6/2014 | Lai et al. |
| 9,063,271 B2 | 6/2015 | Huang |
| 2014/0153117 A1 | 6/2014 | Hagiwara |
| 2014/0362259 A1 | 12/2014 | Yamada et al. |
| 2015/0323765 A1 | 11/2015 | Hashimoto |
| 2016/0004037 A1 | 1/2016 | Chen et al. |

(Continued)

FOREIGN PATENT DOCUMENTS

| CN | 104808318 A | 7/2015 |
| CN | 104808321 A | 7/2015 |

(Continued)

*Primary Examiner* — James Jones
(74) *Attorney, Agent, or Firm* — Locke Lord LLP; Tim Tingkang Xia, Esq.

(57) ABSTRACT

The present disclosure provides an optical imaging lens, comprising, in order from an object side to an image side: a first lens element with positive refractive power having an image-side surface being convex in a paraxial region thereof; a second lens element; a third lens element having positive refractive power; a fourth lens element; a fifth lens element with positive refractive power having an object-side surface being concave in a paraxial region thereof, an image-side surface being convex in a paraxial region thereof, and both the object-side surface and the image-side surface being aspheric; and a sixth lens element having an image-side surface being concave in a paraxial region thereof, at least one convex shape in an off-axial region on the image-side surface, and both an object-side surface and the image-side surface being aspheric. There are a total of six lens elements.

40 Claims, 23 Drawing Sheets

(56) References Cited

U.S. PATENT DOCUMENTS

| | | | |
|---|---|---|---|
| 2016/0018627 A1 | 1/2016 | Lee | |
| 2016/0048005 A1 | 2/2016 | Chen et al. | |
| 2016/0161713 A1* | 6/2016 | Huang | G02B 13/18 |
| | | | 348/373 |
| 2016/0223796 A1 | 8/2016 | Lee et al. | |
| 2016/0223797 A1 | 8/2016 | Zhao | |
| 2016/0356992 A1* | 12/2016 | Chen | G02B 13/0045 |
| 2017/0153421 A1* | 6/2017 | Baik | G02B 5/005 |
| 2017/0219803 A1 | 8/2017 | Lee et al. | |
| 2017/0269339 A1 | 9/2017 | Jung et al. | |

FOREIGN PATENT DOCUMENTS

| | | |
|---|---|---|
| CN | 105319677 A | 2/2016 |
| JP | 2014115431 A | 6/2014 |
| TW | 201239447 A1 | 10/2012 |
| TW | I424188 B | 1/2014 |
| TW | I440925 B | 6/2014 |
| TW | I463168 B | 12/2014 |
| TW | I480574 B | 4/2015 |
| TW | I484215 B | 5/2015 |
| TW | 201520594 A | 6/2015 |
| TW | 201604579 A | 2/2016 |

* cited by examiner

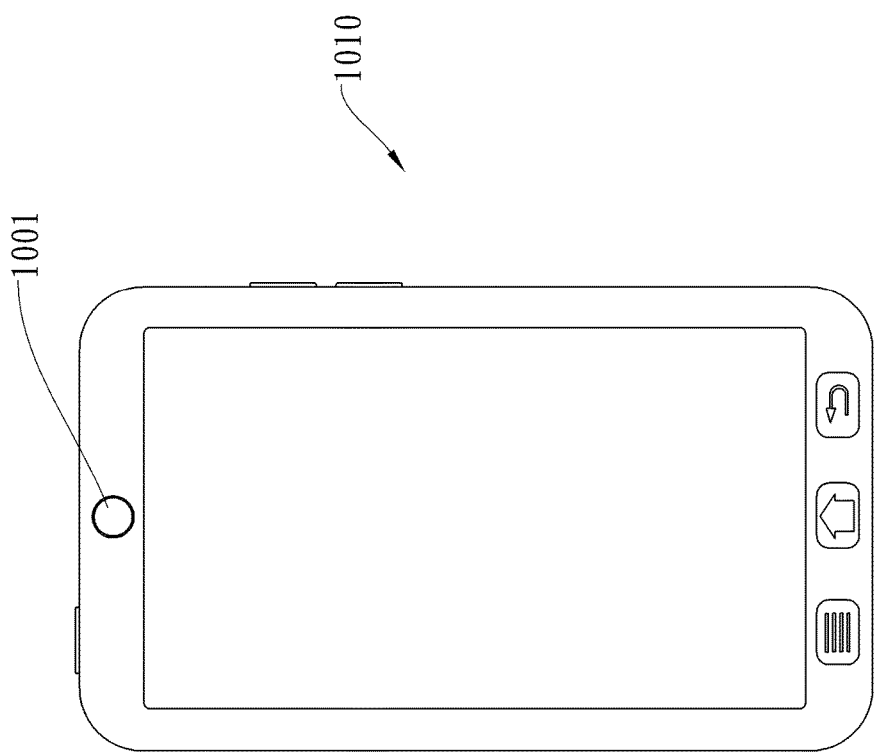

OPTICAL IMAGING LENS, IMAGE CAPTURING APPARATUS AND ELECTRONIC DEVICE

RELATED APPLICATIONS

This application claims priority to Taiwan Application Serial Number 105115692, filed on May 20, 2016, which is incorporated by reference herein in its entirety.

BACKGROUND

Technical Field

The present disclosure relates to an optical imaging lens and an image capturing apparatus, and more particularly, to an optical imaging lens and an image capturing apparatus applicable to electronic devices.

Description of Related Art

As the technology advances rapidly, our lifestyles have become more multifaceted than ever before. In order to enable abundant user experiences, camera modules are widely utilized. In addition to the mobile devices such as smartphones and tablets, the applications of the camera modules for various intelligent electronics, car devices and intelligent home systems, such as optical recognition devices, rear view cameras, driving cameras, sports cameras or drone cameras, have become a trend of the technology development.

Recently, modern electronic products are trending toward miniaturizations, especially in mobile devices, multi-lens imaging devices, and portable video recorders. Therefore, the imaging devices being equipped therein have to be miniaturized. The view angles of the miniaturized imaging systems that are currently available are too limited and do not have sufficient imaging range. Meanwhile, most conventional lens assemblies with a wide field of view usually have configurations of longer total track length or back focus along with a larger size and thus being unable to meet the requirements of miniaturizations. Therefore, there is a need to develop an optical imaging lens which concurrently features a wide field of view and a miniature size with satisfactory imaging quality.

SUMMARY

According to one aspect of the present disclosure, an optical imaging lens, comprising, in order from an object side to an image side: a first lens element with positive refractive power having an image-side surface being convex in a paraxial region thereof; a second lens element; a third lens element having positive refractive power; a fourth lens element; a fifth lens element with positive refractive power having an object-side surface being concave in a paraxial region thereof, an image-side surface being convex in a paraxial region thereof, and both the object-side surface and the image-side surface being aspheric; and a sixth lens element having an image-side surface being concave in a paraxial region thereof, at least one convex shape in an off-axial region on the image-side surface, and both an object-side surface and the image-side surface being aspheric, wherein the optical imaging lens has a total of six lens elements; each of the first lens element, the second lens element, the third lens element, the fourth lens element, the fifth lens element and the sixth lens element is a non-cemented single lens element; a focal length of the first lens element is f1, a focal length of the second lens element is f2, a focal length of the third lens element is f3, a curvature radius of the image-side surface of the first lens element is R2, and the following conditions are satisfied:

$$0 < f3/f1 < 1.50;$$

$$-1.0 < f3/f2 < 1.35; \text{ and}$$

$$-100 < |f1|/R2 < -0.65.$$

According to another aspect of the present disclosure, an image capturing apparatus includes the aforementioned optical imaging lens and an image sensor disposed on an image surface of the optical imaging lens.

According to a further aspect of the present disclosure, an electronic device includes the aforementioned image capturing apparatus.

BRIEF DESCRIPTION OF THE DRAWINGS

FIG. 10A shows a smartphone with an image capturing apparatus of the present disclosure installed therein;

DETAILED DESCRIPTION

Figure 1A:
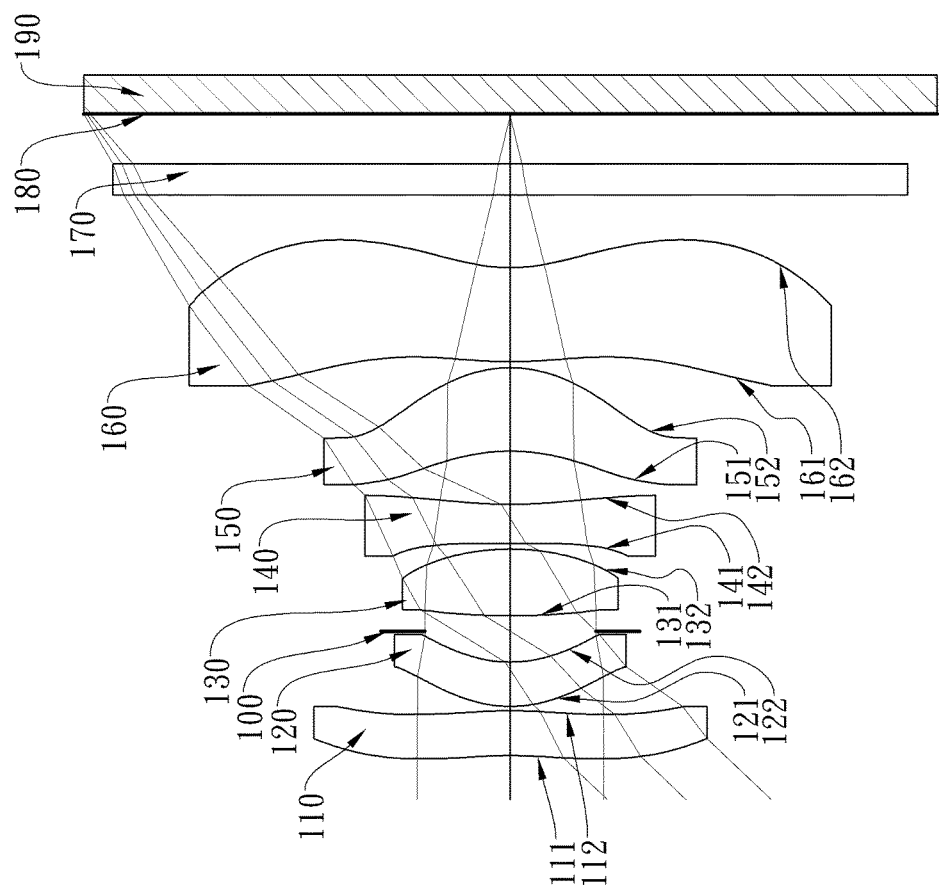
FIG. 1A is a schematic view of an image capturing apparatus according to the 1st embodiment of the present disclosure.

The present disclosure provides an optical imaging lens including, in order from an object side to an image side, a first lens element, a second lens element, a third lens element, a fourth lens element, a fifth lens element, and a sixth lens element.

The first lens element has weaker positive refractive power so that a wide field of view can be favorably achieved, thereby obtaining a larger image forming region. The first lens element has an image-side surface being convex in a paraxial region thereof to further enhance the feature of wide field of view and obtaining an even larger image forming region. The first lens element may have at least one concave shape in an off-axial region on the image-side surface thereof to correct the off-axial aberrations.

The third lens element has positive refractive power, and thus it is favorable for obtaining the light converging ability in an off-axial view field and thereby to correct the Petzval Sum.

The fourth lens element may have negative refractive power and may have an image-side surface being convex in a paraxial region so as to correct the aberrations of the optical imaging lens.

The fifth lens element has positive refractive power and has an object-side surface being concave in a paraxial region, an image-side surface being convex, and both the object-side surface and the image-side surface being aspheric so the light converges, in coordination with the third lens element, toward an image surface.

The sixth lens element has an image-side surface being concave in a paraxial region thereof, at least one convex shape in an off-axial region on the image-side surface thereof, and both an object-side surface and the image-side surface being aspheric so as to enhance the light converging ability in an off-axial region and effectively shorten the total length of the optical imaging lens.

The optical imaging lens has a total of six lens elements; wherein each of the first lens element, the second lens element, the third lens element, the fourth lens element, the fifth lens element and the sixth lens element is a non-cemented single lens element. That is, there is an air gap on an optical axis between any two adjacent lens element of the first lens element, the second lens element, the third lens element, the fourth lens element, the fifth lens element and the sixth lens element of the optical imaging lens. The cementing process is more complicated than the non-cementing process, especially when the two surfaces to be cemented are required to have highly precise curvatures to achieve a highly fitted cemented lens element. Also, during the cementing process, the misalignment may also result a poorly cemented lens element and affect the overall optical imaging quality. Therefore, in the present disclosure, any two of the adjacent lens element may have an air gap on the optical axis in order to avoid the problems from the lens cementation.

When a focal length of the first lens element is f1, a focal length of the second lens element is f2, a focal length of the third lens element is f3, and the following conditions are satisfied: $0<f3/f1<1.50$ and $-1.0<f3/f2<1.35$, the configuration that the first lens element and the second lens element have weaker refractive power can avoid overcorrecting aberrations by overly strong refractive power. Preferably, the following condition can be satisfied: $0<f3/f1<0.90$ or $-0.70<f3/f2<1.0$.

When the focal length of the first lens element is f1, a curvature radius of the image-side surface of the first lens element is R2, and the following condition is satisfied: $-100<|f1|/R2<-0.65$, the effective radius of the first lens element can be enlarged such that the overall shape of the first lens element can be made relatively flat with a wide field of view configuration to achieve better space arrangement. Also, the amount of the incident light can be increased to make the image clearer. Preferably, the following condition can be satisfied: $-50<|f1|/R2<-1.0$. Preferably, the following condition can be satisfied: $-25<|f1|/R2<-1.25$. Preferably, the following condition can be satisfied: $-7.5<|f1|/R2<-1.35$.

When a focal length of the optical imaging lens is f, the focal length of the first lens element is f1, and the following condition is satisfied: $0<f/f1<0.75$, the image distortion in a peripheral region caused by highly refracted light at the wide angle of view, which is due to the overly strong refractive power of the first lens element, can be further avoided.

When the focal length of the optical imaging lens is f, the focal length of the second lens element is f2, and the following condition is satisfied: $-0.50<f/f2<0.50$, the excessive aberrations caused by the overly strong refractive power of the second lens element can be removed. Also, the problems caused by the overly curved surface of the second lens element such as the molding difficulties or excessive surface reflection can be avoided.

When the focal length of the first lens element is f1, a curvature radius of an object-side surface of the first lens element is R1, and the following condition is satisfied: $f1/R1<0.50$, the first lens element can further present the features of being flat with a larger surface area so as to favorably control the incident light, particularly at a wide field of view.

When a curvature radius of the object-side surface of the fifth lens element is R9, a curvature radius of the image-side surface of the fifth lens element is R10, and the following condition is satisfied: $1.25<R9/R10$, the astigmatism of the optical imaging lens can be corrected to obtain clearer images.

When an axial distance between the fourth lens element and the fifth lens element is T45, an axial distance between the fifth lens element and the sixth lens element is T56, and the following condition is satisfied: $1.75<T45/T56$, the arrangement of lens elements on the image side of the optical imaging lens can be more balanced to maintain good image quality and easier to assemble.

When an axial distance between an object-side surface of the first lens element and an image surface is TL, a maximum image height of the optical imaging lens is ImgH, and the following condition is satisfied: TL/ImgH<1.80, the total length of the optical imaging lens can be effectively controlled for miniaturization.

When the focal length of the optical imaging lens is f, the curvature radius of the image-side surface of the first lens element is R2, and the following condition is satisfied: −2.5<f/R2<−0.50, the principal point of the first lens element can be shifted toward the image side to favorably provide the features of wide field of view.

When a curvature radius of an object-side surface of the second lens element is R3, a curvature radius of an image-side surface of the second lens element is R4, and the following condition is satisfied: 1.0<R3/R4<2.0, it is favorable to correct the aberrations of the first lens element and retrieve the light at the peripheral region of the optical imaging lens.

When the curvature radius of the image-side surface of the first lens element is R2, a curvature radius of an object-side surface of the third lens element is R5, and the following condition is satisfied: −1.5<R2/R5<1.0, a more proper arrangement of the lens surfaces located between the first lens element and the third lens element can be obtained and thus effectively facilitates higher imaging performance.

Figure 9:
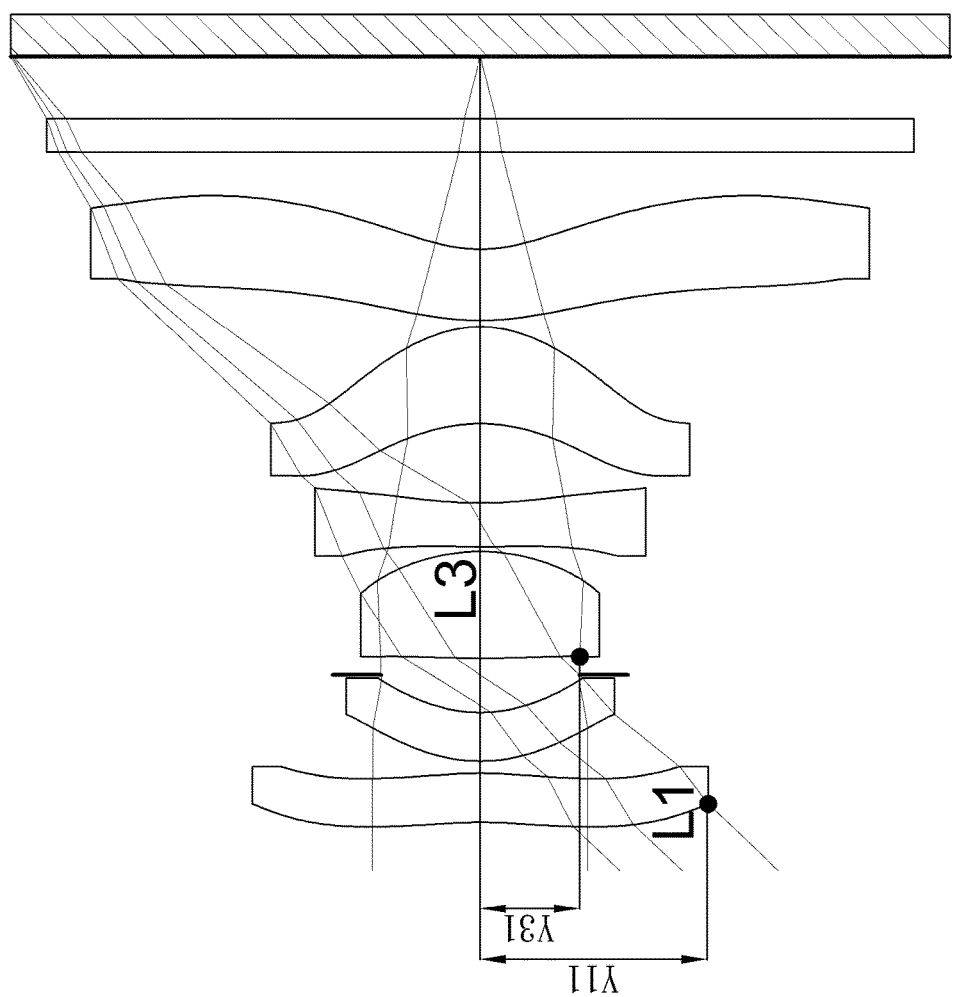
FIG. 9 is a schematic view showing distances represented by the parameters Y11, Y31 of an optical imaging lens of the present disclosure.

Please refer to FIG. 9. When a vertical distance between a maximum effective diameter position on an object-side surface of the first lens element (L1) and an optical axis is Y11, a vertical distance between a maximum effective diameter position on an object-side surface of the third lens element (L3) and the optical axis is Y31, and the following condition is satisfied: 2.0<Y11/Y31<4.0, it provides a sufficient amount of incident light and improves the image quality and image resolving power.

When the focal length of the optical imaging lens is f, the maximum image height of the optical imaging lens is ImgH, and the following condition is satisfied: 0.5<f/ImgH<1.05, the optical imaging lens can obtain a shorter total track length and wide field of view.

When an axial distance between an object-side surface of the first lens element and the image-side surface of the sixth lens element is Td, a sum of central thicknesses of the first lens element, the second lens element, the third lens element, the fourth lens element, the fifth lens element, and the sixth lens element is ΣCT, and the following condition is satisfied: 1.10<Td/ΣCT<1.40, it is favorable to obtain better space utilization by shortening the total track length.

When the focal length of the third lens element is f3, a focal length of the fourth lens element is f4, and the following condition is satisfied: 1.40<|f4/f3|<5.0, the fourth lens element can better balance the third lens element with relatively strong refractive power by reducing the aberrations caused by the third lens element and the sensitivity in the optical imaging lens.

According to the optical imaging lens of the present disclosure, the lens elements thereof can be made of glass or plastic material. When the lens elements are made of glass material, the distribution of the refractive power of the optical imaging lens may be more flexible to design. When the lens elements are made of plastic material, the manufacturing cost can be effectively reduced. Furthermore, surfaces of each lens element can be arranged to be aspheric (ASP). Since these aspheric surfaces can be easily formed into shapes other than spherical shapes so as to have more controllable variables for eliminating aberrations and to further decrease the required quantity of lens elements, the total track length of the optical imaging lens can be effectively reduced.

According to the optical imaging lens of the present disclosure, the optical imaging lens can include at least one stop, such as an aperture stop, a glare stop or a field stop, so as to favorably reduce the amount of stray light and thereby improving the image quality.

According to the optical imaging lens of the present disclosure, an aperture stop can be configured as a front stop or a middle stop. A front stop disposed between an imaged object and the first lens element can provide a longer distance between an exit pupil of the optical imaging lens and the image surface so that the generated telecentric effect can improve the image-sensing efficiency of an image sensor, such as a CCD or CMOS sensor. A middle stop disposed between the first lens element and the image surface is favorable for enlarging the field of view of the optical imaging lens, thereby providing the optical imaging lens with the advantage of a wide-angle lens.

According to the optical imaging lens of the present disclosure, when the lens element has a convex surface and the region of convex shape is not defined, it indicates that the surface can be convex in the paraxial region thereof. When the lens element has a concave surface and the region of concave shape is not defined, it indicates that the surface can be concave in the paraxial region thereof. Likewise, when the region of refractive power or focal length of a lens element is not defined, it indicates that the region of refractive power or focal length of the lens element can be in the paraxial region thereof.

According to the optical imaging lens of the present disclosure, the image surface of the optical imaging lens, based on the corresponding image sensor, can be a plane or a curved surface with an arbitrary curvature, especially a curved surface being concave facing towards the object side.

The optical imaging lens of the present disclosure can be optionally applied to moving focus optical systems. According to the optical imaging lens of the present disclosure, the optical imaging lens features a good correction capability and high image quality, and can be applied to 3D (three-dimensional) image capturing applications and electronic devices, such as digital cameras, mobile devices, smartphones, digital tablets, smart TVs, network surveillance devices, motion sensing game console, driving recording systems, rear view camera systems, drone cameras and wearable devices.

According to the present disclosure, an image capturing apparatus includes the aforementioned optical imaging lens and an image sensor, wherein the image sensor is disposed on or near an image surface of the optical imaging lens. Therefore, the design of the optical imaging lens enables the image capturing apparatus to achieve the best image quality. Preferably, the optical imaging lens can further include a barrel member, a holder member or a combination thereof.

Figure 10B:
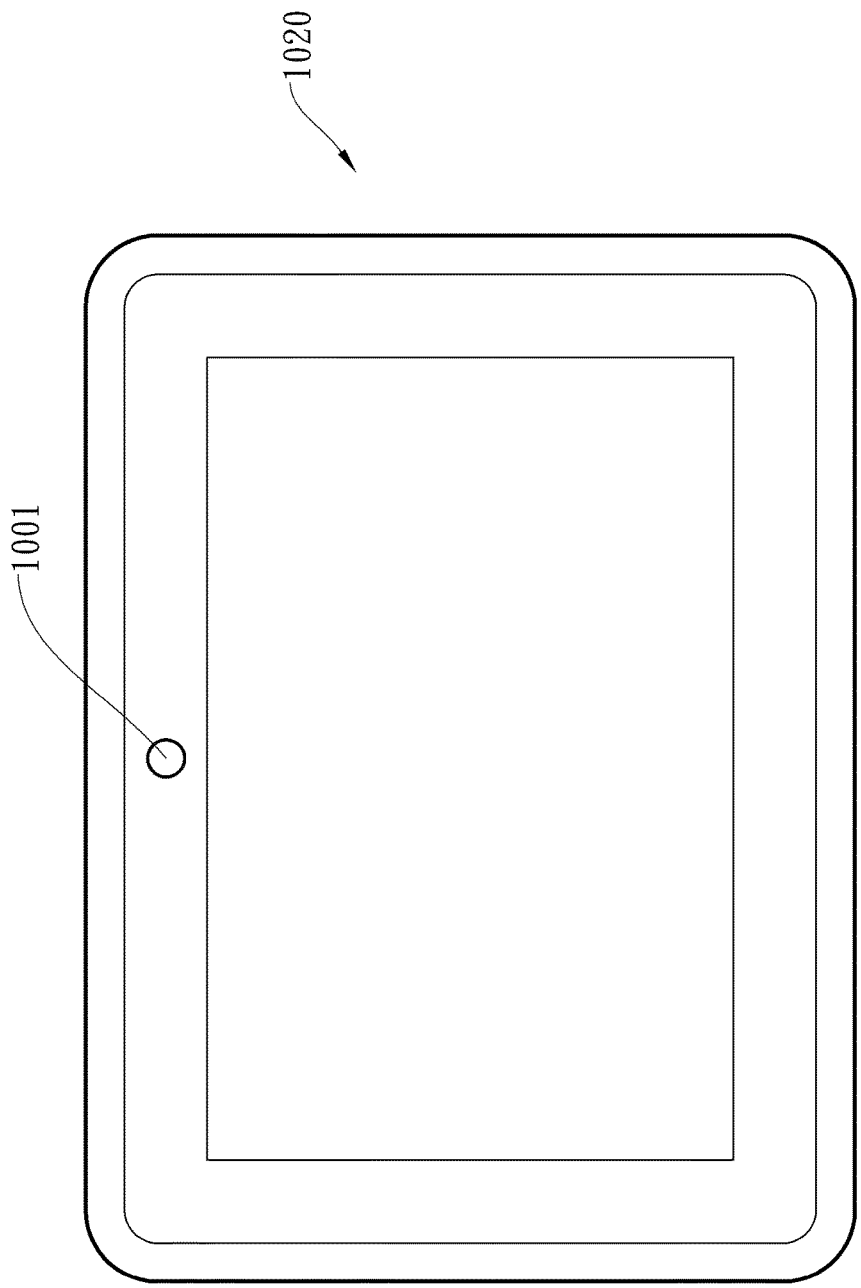
FIG. 10B shows a tablet with an image capturing apparatus of the present disclosure installed therein.
Figure 10C:
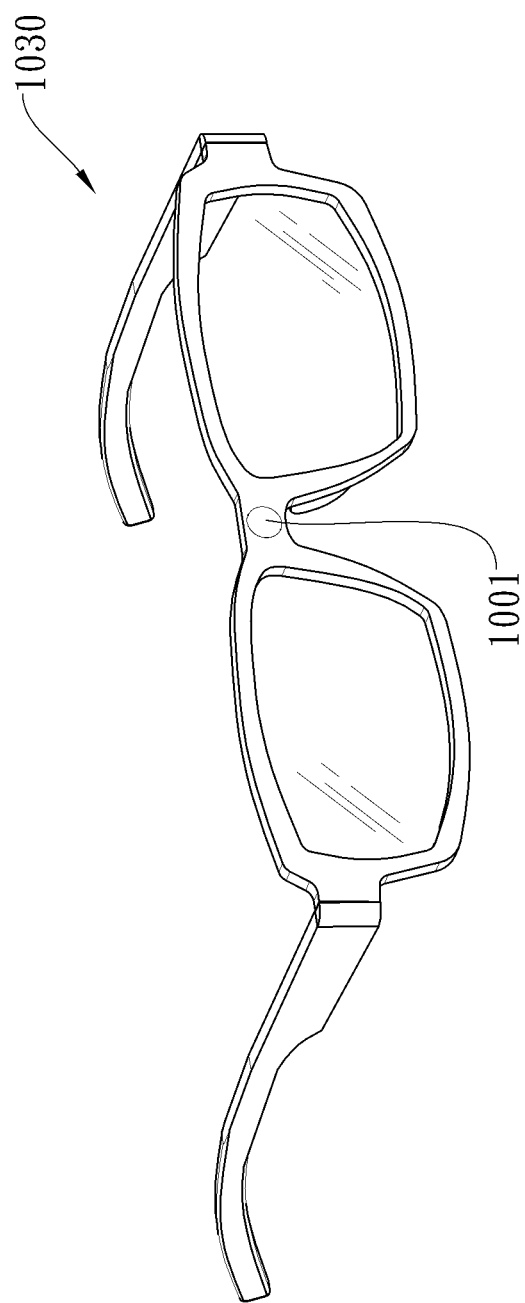
FIG. 10C shows a wearable device with an image capturing apparatus of the present disclosure installed therein.

Please refer to FIG. 10A, FIG. 10B and FIG. 10C, an image capturing apparatus 1001 may be installed in an electronic device including, but not limited to, a smartphone 1010, a tablet 1020, or a wearable device 1030. The four exemplary figures of different electronic devices are only exemplary for showing the image capturing apparatus of the present disclosure installed in an electronic device, and the present disclosure is not limited thereto. Preferably, the electronic device can further include a control unit, a display unit, a storage unit, a random access memory unit (RAM) or a combination thereof.

Figure 11A:
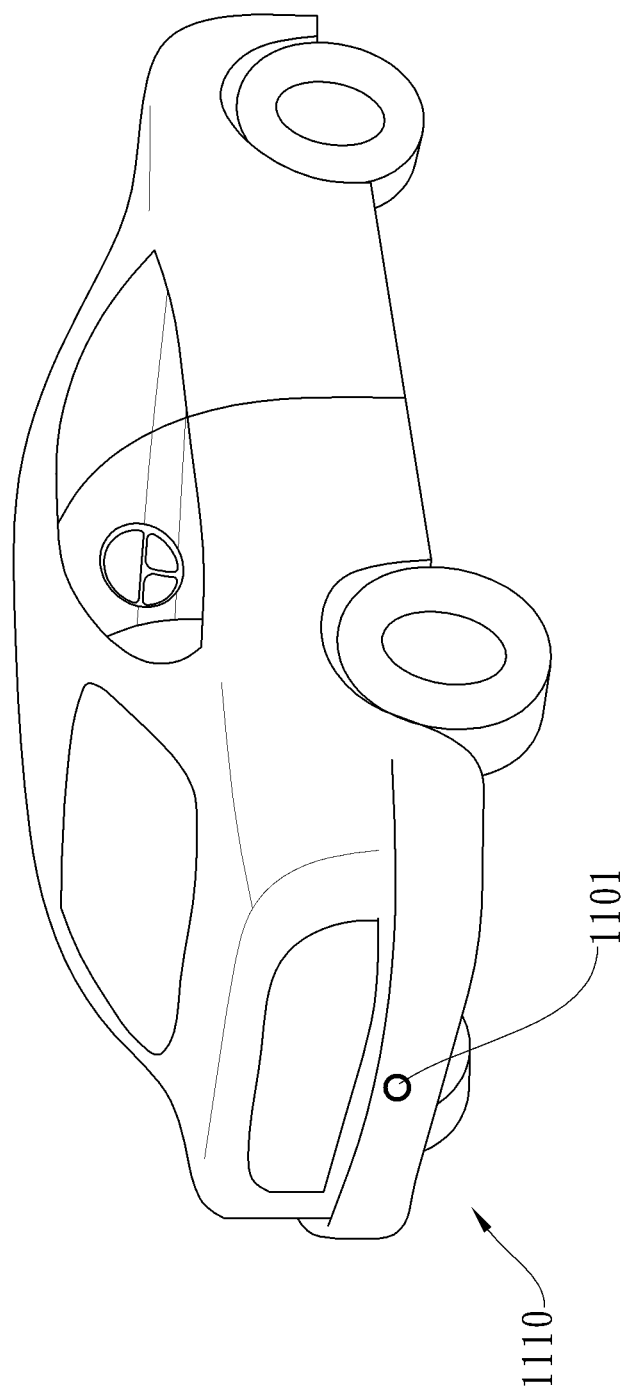
FIG. 11A shows a rear view camera with an image capturing apparatus of the present disclosure installed therein.
Figure 11B:
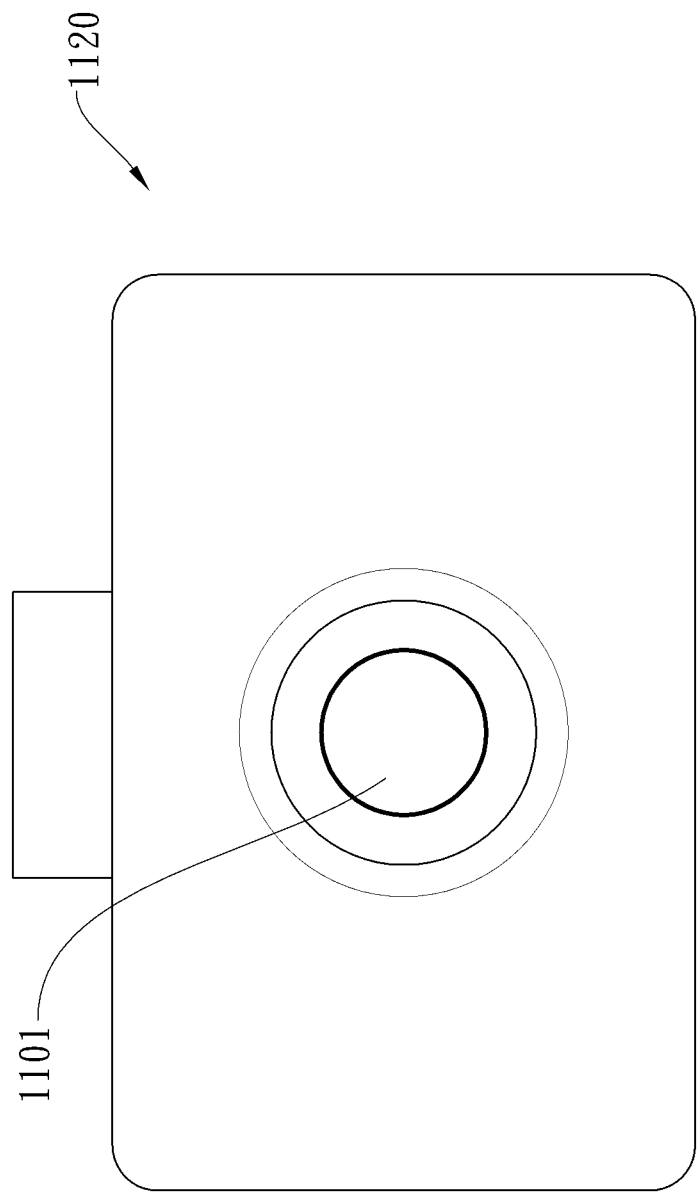
FIG. 11B shows a driving recording system with an image capturing apparatus of the present disclosure installed therein.
Figure 11C:
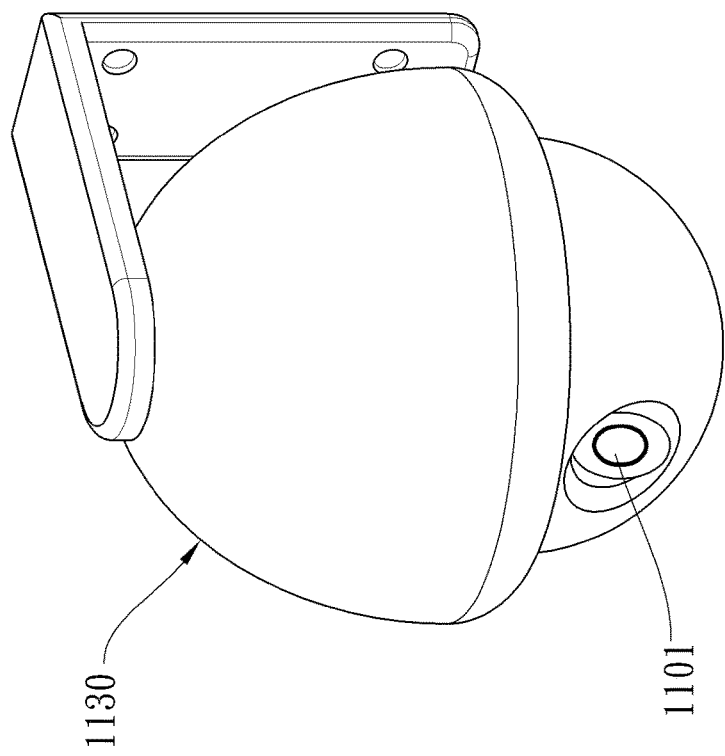
FIG. 11C shows a surveillance camera with an image capturing apparatus of the present disclosure installed therein.

Please refer to FIG. 11A, FIG. 11B and FIG. 11C, an image capturing apparatus 1101 may be installed in an electronic device including, but not limited to, a rear view camera 1110, a driving recording system 1120, or a surveillance camera 1230. The four exemplary figures of different electronic devices are only exemplary for showing the image capturing apparatus of the present disclosure installed in an electronic device, and the present disclosure is not limited thereto. Preferably, the electronic device can further include a control unit, a display unit, a storage unit, a random access memory unit (RAM) or a combination thereof.

According to the above description of the present disclosure, the following 1st-8th specific embodiments are provided for further explanation.

1st Embodiment

Figure 1B:
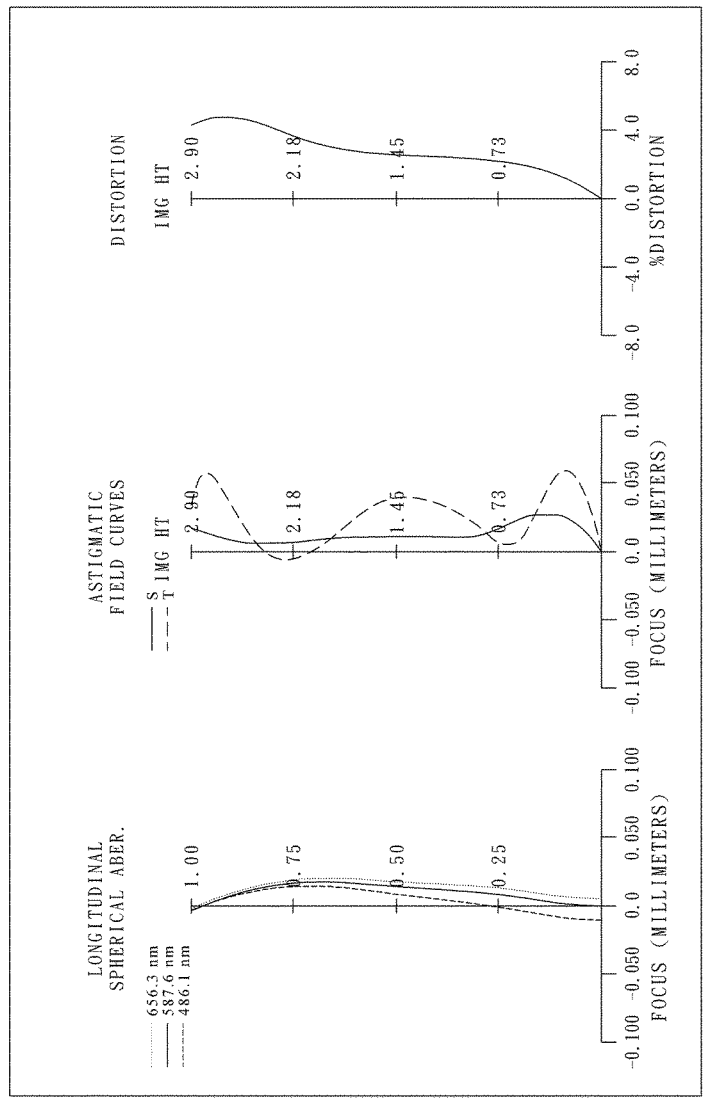
FIG. 1B shows longitudinal spherical aberration curves, astigmatic field curves and a distortion curve of the image capturing apparatus according to the 1st embodiment.

FIG. 1A is a schematic view of an image capturing apparatus according to the 1st embodiment of the present disclosure. FIG. 1B shows, in order from left to right, longitudinal spherical aberration curves, astigmatic field curves and a distortion curve of the image capturing apparatus according to the 1st embodiment.

In FIG. 1A, the image capturing apparatus includes an optical imaging lens (not otherwise herein labeled) of the present disclosure and an image sensor 190. The optical imaging lens includes, in order from an object side to an image side, a first lens element 110, a second lens element 120, an aperture stop 100, a third lens element 130, a fourth lens element 140, a fifth lens element 150 and a sixth lens element 160.

The first lens element 110 with positive refractive power has an object-side surface 111 being concave in a paraxial region thereof, an image-side surface 112 being convex in a paraxial region thereof, both the object-side surface 111 and the image-side surface 112 being aspheric, and at least one concave shape in an off-axial region on the image-side surface 112. The first lens element 110 is made of plastic material.

The second lens element 120 with positive refractive power has an object-side surface 121 being convex in a paraxial region thereof, an image-side surface 122 being concave in a paraxial region thereof, and both the object-side surface 121 and the image-side surface 122 being aspheric. The second lens element 120 is made of plastic material.

The third lens element 130 with positive refractive power has an object-side surface 131 being convex in a paraxial region thereof, an image-side surface 132 being convex in a paraxial region thereof, and both the object-side surface 131 and the image-side surface 132 being aspheric. The third lens element 130 is made of plastic material.

The fourth lens element 140 with negative refractive power has an object-side surface 141 being convex in a paraxial region thereof, an image-side surface 142 being concave in a paraxial region thereof, and both the object-side surface 141 and the image-side surface 142 being aspheric. The fourth lens element 140 is made of plastic material.

The fifth lens element 150 with positive refractive power has an object-side surface 151 being concave in a paraxial region thereof, an image-side surface 152 being convex in a paraxial region thereof, and both the object-side surface 151 and the image-side surface 152 being aspheric The fifth lens element 150 is made of plastic material.

The sixth lens element 160 with negative refractive power has an object-side surface 161 being convex in a paraxial region thereof, an image-side surface 162 being concave in a paraxial region thereof, both the object-side surface 161 and the image-side surface 162 being aspheric, and at least one convex shape in an off-axial region on the image-side surface 162. The sixth lens element 160 is made of plastic material.

The optical imaging lens further includes an IR cut filter 170 located between the sixth lens element 160 and an image surface 180. The IR cut filter 170 is made of glass material and will not affect the focal length of the optical imaging lens. The image sensor 190 is disposed on or near the image surface 180 of the optical imaging lens.

The detailed optical data of the 1st embodiment are shown in TABLE 1, and the aspheric surface data are shown in TABLE 2, wherein the units of the curvature radius, the thickness and the focal length are expressed in mm, and HFOV is a half of the maximal field of view.

TABLE 1

(1st Embodiment)
f = 2.63 mm, Fno = 2.05, HFOV = 46.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | -3.152 ASP | 0.307 | Plastic | 1.544 | 55.9 | 87.53 |
| 2 | | -3.058 ASP | 0.030 | | | | |
| 3 | Lens 2 | 0.894 ASP | 0.303 | Plastic | 1.515 | 56.5 | 17.16 |
| 4 | | 0.880 ASP | 0.211 | | | | |
| 5 | Ape. Stop | Plano | 0.106 | | | | |
| 6 | Lens 3 | 4.974 ASP | 0.461 | Plastic | 1.544 | 55.9 | 2.47 |
| 7 | | -1.777 ASP | 0.037 | | | | |
| 8 | Lens 4 | 18.139 ASP | 0.270 | Plastic | 1.660 | 20.4 | -5.97 |
| 9 | | 3.217 ASP | 0.364 | | | | |
| 10 | Lens 5 | -1.364 ASP | 0.571 | Plastic | 1.544 | 55.9 | 3.12 |
| 11 | | -0.868 ASP | 0.040 | | | | |
| 12 | Lens 6 | 2.595 ASP | 0.648 | Plastic | 1.583 | 30.2 | -4.01 |
| 13 | | 1.117 ASP | 0.500 | | | | |
| 14 | IR Cut Filter | Plano | 0.210 | Glass | 1.517 | 64.2 | |
| 15 | | Plano | 0.342 | | | | |
| 16 | Image Surface | Plano | — | | | | |

Note:
Reference wavelength is d-line 587.6 nm.
The effective radius of Surface 7 is 0.740 mm.

TABLE 2

Aspheric Coefficients

| Surface # | 1 | 2 | 3 | 4 |
|---|---|---|---|---|
| k = | −8.9662E+01 | −8.9823E+01 | −8.8233E−01 | −4.0713E+00 |
| A4 = | 1.4246E−01 | 1.2046E−01 | −1.0903E−01 | 3.0249E−01 |
| A6 = | −8.8256E−02 | −8.2974E−02 | −1.5998E−01 | −2.0578E−01 |
| A8 = | 4.2965E−02 | 5.1685E−02 | 1.9006E−01 | −2.1017E−01 |
| A10 = | −9.0866E−03 | −1.5541E−02 | −3.5459E−01 | |

| Surface # | 6 | 7 | 8 | 9 |
|---|---|---|---|---|
| k = | −1.0000E+00 | −1.8035E+00 | 4.8422E+01 | −1.9643E+01 |
| A4 = | 3.7337E−02 | −2.2054E−01 | −3.5601E−01 | −1.0952E−01 |
| A6 = | −1.0296E−01 | 4.6318E−01 | 7.3229E−01 | 1.7947E−01 |
| A8 = | 5.1360E−01 | −1.0507E+00 | −2.2445E+00 | −4.2365E−01 |
| A10 = | −9.1491E−01 | 1.5375E+00 | 4.8187E+00 | 7.0080E−01 |
| A12 = | | −1.6445E+00 | −6.1384E+00 | −6.2366E−01 |
| A14 = | | | 3.0734E+00 | 2.2175E−01 |

| Surface # | 10 | 11 | 12 | 13 |
|---|---|---|---|---|
| k = | −7.9984E−01 | −8.1567E+00 | 6.8064E−01 | −5.5667E+00 |
| A4 = | 1.3474E−01 | −1.0765E+00 | −4.0322E−01 | −1.7050E−01 |
| A6 = | −3.8368E−01 | 2.6278E+00 | 3.7250E−01 | 1.0584E−01 |
| A8 = | 1.2711E+00 | −4.4677E+00 | −2.5834E−01 | −4.7105E−02 |
| A10 = | −1.6754E+00 | 5.0863E+00 | 1.1901E−01 | 1.2762E−02 |
| A12 = | 1.3413E+00 | −3.3101E+00 | −3.3701E−02 | −1.9787E−03 |
| A14 = | −7.0416E−01 | 1.1084E+00 | 5.2723E−03 | 1.5546E−04 |
| A16 = | 1.7225E−01 | −1.4896E−01 | −3.5158E−04 | −4.5385E−06 |

The equation of the aspheric surface profiles is expressed as follows:

$$X(Y) = (Y^2/R)/(1 + \mathrm{sqrt}(1 - (1+k)*(Y/R)^2)) + \sum_i (Ai)*(Y^i)$$

where:

X is the relative distance between a point on the aspheric surface spaced at a distance Y from the optical axis and the tangential plane at the aspheric surface vertex on the optical axis;

Y is the vertical distance from the point on the aspheric surface profile to the optical axis;

R is the curvature radius;

k is the conic coefficient; and

Ai is the i-th aspheric coefficient.

In the 1st embodiment, a focal length of the optical imaging lens is f, an f-number of the optical imaging lens is Fno, a half of a maximal field of view of the optical imaging lens is HFOV, and these parameters have the following values: f=2.63 mm; Fno=2.05; and HFOV=46.5 degrees.

In the 1st embodiment, an axial distance between the fourth lens element 140 and the fifth lens element 150 is T45, an axial distance between the fifth lens element 150 and the sixth lens element 160 is T56, and they satisfy the condition: T45/T56=9.1.

In the 1st embodiment, an axial distance between the object-side surface 111 of the first lens element 110 and the image-side surface 162 of the sixth lens element 160 is Td, a sum of central thicknesses of the first lens element 110, the second lens element 120, the third lens element 130, the fourth lens element 140, the fifth lens element 150 and the sixth lens element 160 is ΣCT, and they satisfy the condition: Td/ΣCT=1.31.

In the 1st embodiment, an axial distance between the object-side surface 111 of the first lens element 110 and the image surface 180 is TL, a maximum image height of the optical imaging lens is ImgH, and they satisfy the condition: TL/ImgH=1.52.

In the 1st embodiment, a vertical distance between a maximum effective diameter position on the object-side surface 111 of the first lens element 110 and an optical axis is Y11, a vertical distance between a maximum effective diameter position on the object-side surface 131 of the third lens element 130 and the optical axis is Y31, and they satisfy the condition: Y11/Y31=2.17.

In the 1st embodiment, a curvature radius of the image-side surface 112 of the first lens element 110 is R2, a curvature radius of the object-side surface 131 of the third lens element 130 is R5, and they satisfy the condition: R2/R5=−0.61.

In the 1st embodiment, a curvature radius of the object-side surface 121 of the second lens element 120 is R3, a curvature radius of the image-side surface 122 of the second lens element 120 is R4, and they satisfy the condition: R3/R4=1.02.

In the 1st embodiment, a curvature radius of the object-side surface 151 of the fifth lens element 150 is R9, a curvature radius of the image-side surface 152 of the fifth lens element 150 is R10, and they satisfy the condition: R9/R10=1.57.

In the 1st embodiment, a focal length of the first lens element 110 is f1, a curvature radius of the object-side surface 111 of the first lens element 110 is R1, and they satisfy the condition: f1/R1=−27.77.

In the 1st embodiment, the focal length of the first lens element 110 is f1, the curvature radius of the image-side surface 112 of the first lens element 110 is R2, and they satisfy the condition: |f1|/R2=−28.62.

In the 1st embodiment, the focal length of the first lens element 110 is f1, a focal length of the third lens element 130 is f3, and they satisfy the condition: f3/f1=0.03.

In the 1st embodiment, a focal length of the second lens element 120 is f2, the focal length of the third lens element 130 is f3, and they satisfy the condition: f3/f2=0.14.

In the 1st embodiment, the focal length of the third lens element 130 is f3, a focal length of the fourth lens element 140 is f4, and they satisfy the condition: |f4/f3|=2.42.

In the 1st embodiment, the focal length of the optical imaging lens is f, the maximum image height of the optical imaging lens is ImgH, and they satisfy the condition: f/ImgH=0.91.

In the 1st embodiment, the focal length of the optical imaging lens is f, the curvature radius of the image-side surface 112 of the first lens element 110 is R2, and they satisfy the condition: f/R2=−0.86.

In the 1st embodiment, the focal length of the optical imaging lens is f, the focal length of the first lens element 110 is f1, and they satisfy the condition: f/f1=0.03.

In the 1st embodiment, the focal length of the optical imaging lens is f, the focal length of the second lens element 120 is f2, and they satisfy the condition: f/f2=0.15.

2nd Embodiment

Figure 2A:
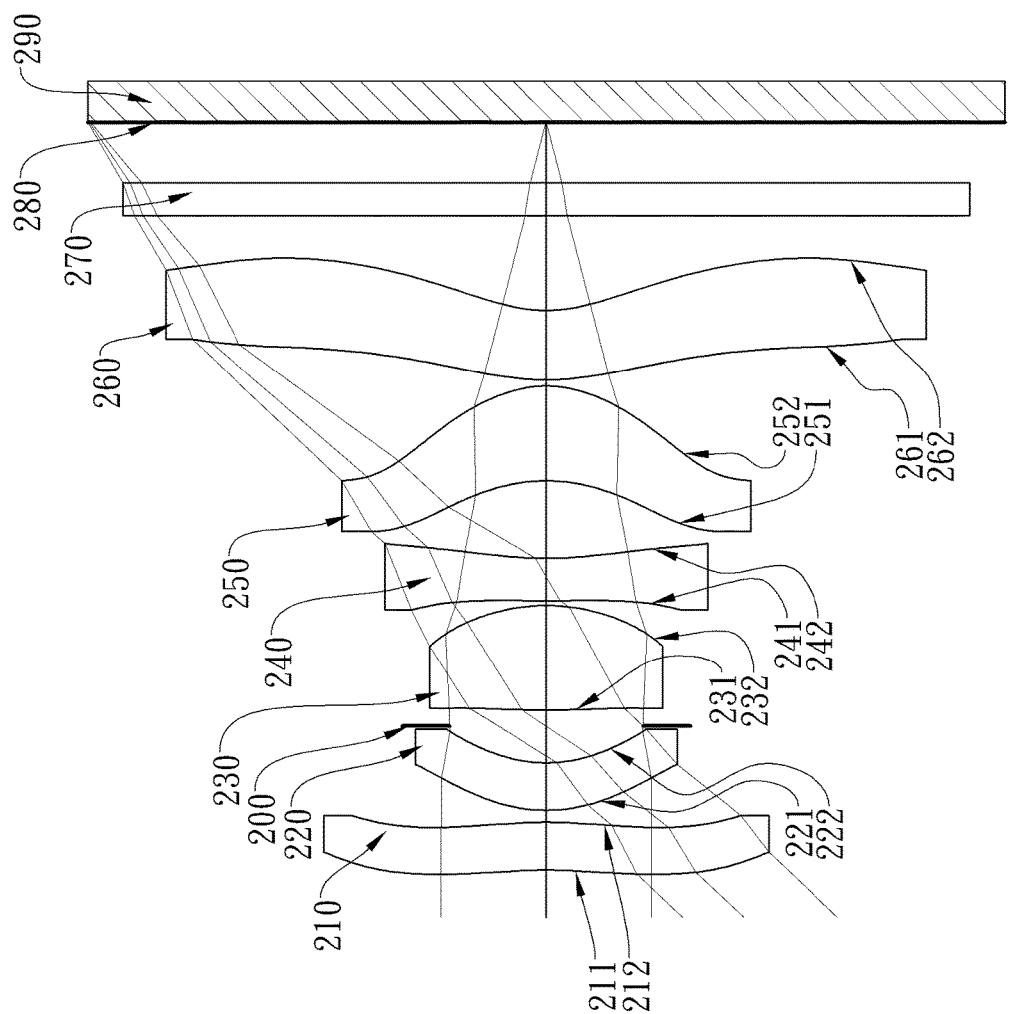
FIG. 2A is a schematic view of an image capturing apparatus according to the 2nd embodiment of the present disclosure.
Figure 2B:
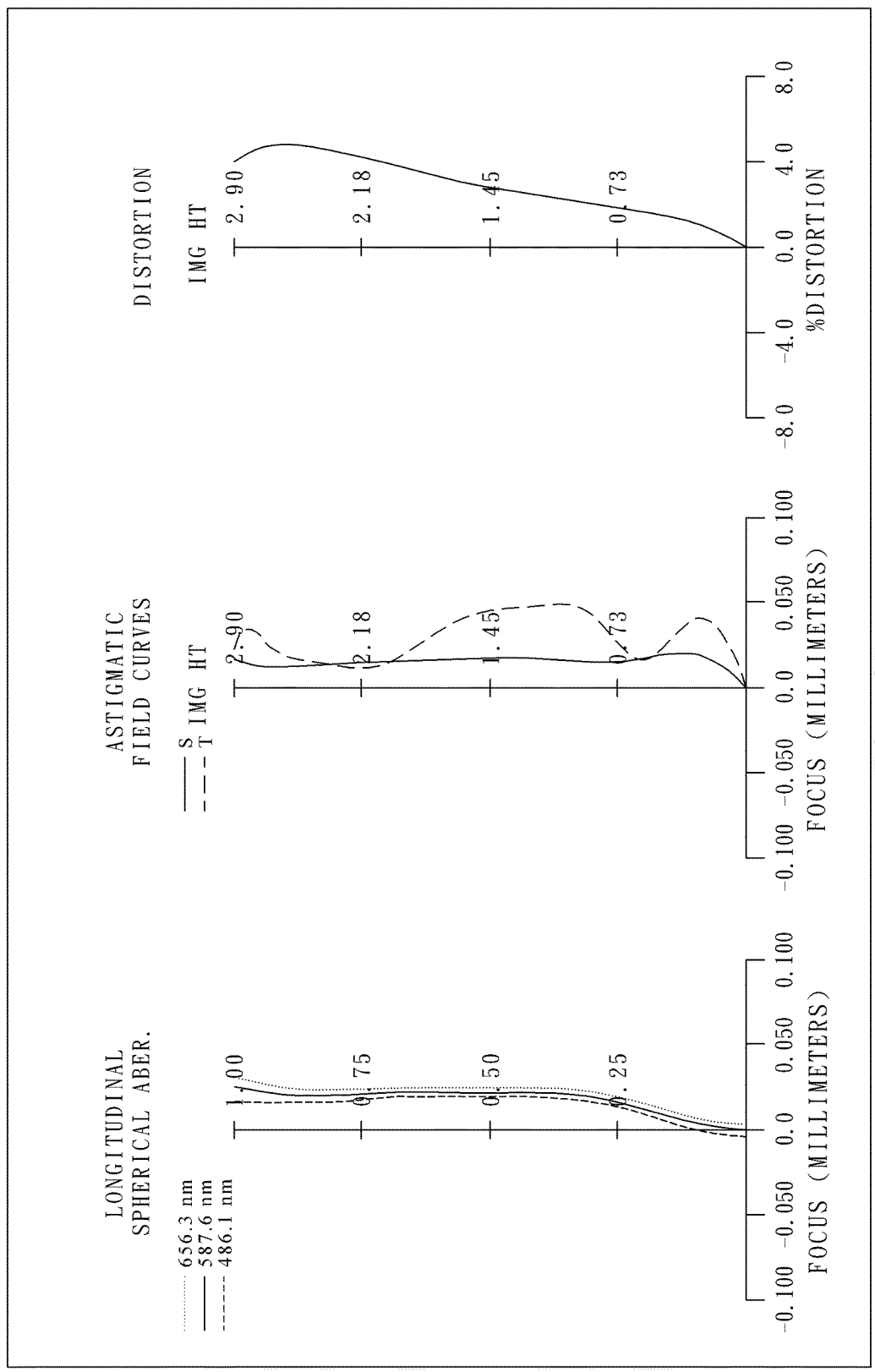
FIG. 2B shows longitudinal spherical aberration curves, astigmatic field curves and a distortion curve of the image capturing apparatus according to the 2nd embodiment.

FIG. 2A is a schematic view of an image capturing apparatus according to the 2nd embodiment of the present disclosure. FIG. 2B shows, in order from left to right, longitudinal spherical aberration curves, astigmatic field curves and a distortion curve of the image capturing apparatus according to the 2nd embodiment.

In FIG. 2A, the image capturing apparatus includes an optical imaging lens (not otherwise herein labeled) of the present disclosure and an image sensor 290. The optical imaging lens includes, in order from an object side to an image side, a first lens element 210, a second lens element 220, an aperture stop 200, a third lens element 230, a fourth lens element 240, a fifth lens element 250 and a sixth lens element 260.

The first lens element 210 with positive refractive power has an object-side surface 211 being concave in a paraxial region thereof, an image-side surface 212 being convex in a paraxial region thereof, both the object-side surface 211 and the image-side surface 212 being aspheric, and at least one concave shape in an off-axial region on the image-side surface 212. The first lens element 210 is made of plastic material.

The second lens element 220 with negative refractive power has an object-side surface 221 being convex in a paraxial region thereof, an image-side surface 222 being concave in a paraxial region thereof, and both the object-side surface 221 and the image-side surface 222 being aspheric. The second lens element 220 is made of plastic material.

The third lens element 230 with positive refractive power has an object-side surface 231 being convex in a paraxial region thereof, an image-side surface 232 being convex in a paraxial region thereof, and both the object-side surface 231 and the image-side surface 232 being aspheric. The third lens element 230 is made of plastic material.

The fourth lens element 240 with negative refractive power has an object-side surface 241 being convex in a paraxial region thereof, an image-side surface 242 being concave in a paraxial region thereof, and both the object-side surface 241 and the image-side surface 242 being aspheric. The fourth lens element 240 is made of plastic material.

The fifth lens element 250 with positive refractive power has an object-side surface 251 being concave in a paraxial region thereof, an image-side surface 252 being convex in a paraxial region thereof, and both the object-side surface 251 and the image-side surface 252 being aspheric The fifth lens element 250 is made of plastic material.

The sixth lens element 260 with negative refractive power has an object-side surface 261 being convex in a paraxial region thereof, an image-side surface 262 being concave in a paraxial region thereof, both the object-side surface 261 and the image-side surface 262 being aspheric, and at least one convex shape in an off-axial region on the image-side surface 262. The sixth lens element 260 is made of plastic material.

The optical imaging lens further includes an IR cut filter 270 located between the sixth lens element 260 and an image surface 280. The IR cut filter 270 is made of glass material and will not affect the focal length of the optical imaging lens. The image sensor 290 is disposed on or near the image surface 280 of the optical imaging lens.

The detailed optical data of the 2nd embodiment are shown in TABLE 3, and the aspheric surface data are shown in TABLE 4, wherein the units of the curvature radius, the thickness and the focal length are expressed in mm, and HFOV is a half of the maximal field of view.

TABLE 3

(2nd Embodiment)
f = 2.62 mm, Fno = 1.96, HFOV = 46.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −3.273 ASP | 0.304 | Plastic | 1.544 | 55.9 | 28.80 |
| 2 | | −2.796 ASP | 0.075 | | | | |
| 3 | Lens 2 | 0.992 ASP | 0.301 | Plastic | 1.515 | 56.5 | −87.97 |
| 4 | | 0.871 ASP | 0.234 | | | | |
| 5 | Ape. Stop | Plano | 0.102 | | | | |
| 6 | Lens 3 | 7.727 ASP | 0.666 | Plastic | 1.544 | 55.9 | 2.00 |
| 7 | | −1.230 ASP | 0.030 | | | | |
| 8 | Lens 4 | 12.375 ASP | 0.270 | Plastic | 1.660 | 20.4 | −4.38 |
| 9 | | 2.324 ASP | 0.492 | | | | |
| 10 | Lens 5 | −1.084 ASP | 0.602 | Plastic | 1.544 | 55.9 | 2.55 |
| 11 | | −0.728 ASP | 0.040 | | | | |
| 12 | Lens 6 | 1.652 ASP | 0.442 | Plastic | 1.639 | 23.5 | −3.63 |
| 13 | | 0.864 ASP | 0.600 | | | | |
| 14 | IR Cut Filter | Plano | 0.210 | Glass | 1.517 | 64.2 | |
| 15 | | Plano | 0.383 | | | | |
| 16 | Image Surface | Plano | | | | | |

Note:
Reference wavelength is d-line 587.6 nm
The effective radius of Surface 7 is 0.740 mm.

TABLE 4

Aspheric Coefficients

| Surface # | 1 | 2 | 3 | 4 |
|---|---|---|---|---|
| k = | −7.1311E+01 | −6.9848E+01 | −7.1570E−01 | −3.3207E+00 |
| A4 = | 1.1743E−01 | 1.0572E−01 | −5.0713E−02 | 2.3500E−01 |
| A6 = | −7.2426E−02 | −7.5048E−02 | −3.4419E−01 | −2.1137E−01 |
| A8 = | 3.8003E−02 | 6.1201E−02 | 5.4864E−01 | 1.3803E−01 |
| A10 = | −7.9509E−03 | −1.8856E−02 | −4.0010E−01 | |

| Surface # | 6 | 7 | 8 | 9 |
|---|---|---|---|---|
| k = | −1.0000E+00 | −1.7348E+00 | 4.8422E+01 | −1.9643E+01 |
| A4 = | −3.3636E−02 | −1.0548E−01 | −2.9688E−01 | −1.3814E−01 |
| A6 = | −1.5431E−01 | 1.6806E−01 | 6.5610E−01 | 2.8313E−01 |

TABLE 4-continued

| Aspheric Coefficients | | | | |
|---|---|---|---|---|
| A8 = | 2.7783E−01 | −1.1220E+00 | −1.7488E+00 | −5.0703E−01 |
| A10 = | −8.0092E−01 | 1.8553E+00 | 2.6414E+00 | 5.4571E−01 |
| A12 = | | −1.3752E+00 | −2.0839E+00 | −3.0528E−01 |
| A14 = | | | 7.0793E−01 | 7.4431E−02 |

| Surface # | 10 | 11 | 12 | 13 |
|---|---|---|---|---|
| k = | −8.9745E−01 | −4.7053E+00 | −6.1276E−01 | −5.5667E+00 |
| A4 = | 1.2080E−01 | −6.9395E−01 | −2.6857E−01 | −9.7006E−02 |
| A6 = | −3.7127E−01 | 1.4355E+00 | 1.6007E−01 | 4.5669E−02 |
| A8 = | 9.5745E−01 | −2.3450E+00 | −6.9018E−02 | −1.3189E−02 |
| A10 = | −5.7183E−01 | 2.6560E+00 | 1.8902E−02 | 1.9318E−03 |
| A12 = | −2.1161E−01 | −1.6842E+00 | −3.1184E−03 | −7.3584E−05 |
| A14 = | 3.2578E−01 | 5.4246E−01 | 2.8130E−04 | −1.1654E−05 |
| A16 = | −8.9311E−02 | −6.9854E−02 | −1.0725E−05 | 9.9606E−07 |

In the 2nd embodiment, the equation of the aspheric surface profiles of the aforementioned lens elements is the same as the equation of the 1st embodiment. Also, the definitions of these parameters shown in TABLE 5 below are the same as those stated in the 1st embodiment with corresponding values for the 2nd embodiment, so an explanation in this regard will not be provided again.

Moreover, these parameters can be calculated from TABLE 3 and TABLE 4 and satisfy the conditions stated in TABLE 5.

TABLE 5

| 2nd Embodiment | | | |
|---|---|---|---|
| f [mm] | 2.62 | f1/R1 | −8.80 |
| f/EPD | 1.96 | |f1|/R2 | −10.30 |
| HFOV [deg.] | 46.6 | f3/f1 | 0.07 |
| T45/T56 | 12.30 | f3/f2 | −0.02 |
| Td/ΣCT | 1.38 | |f4/f3| | 2.19 |
| TL/ImgH | 1.64 | f/ImgH | 0.90 |
| Y11/Y31 | 2.26 | f/R2 | −0.94 |
| R2/R5 | −0.36 | f/f1 | 0.09 |
| R3/R4 | 1.14 | f/f2 | −0.03 |
| R9/R10 | 1.49 | | |

3rd Embodiment

Figure 3A:
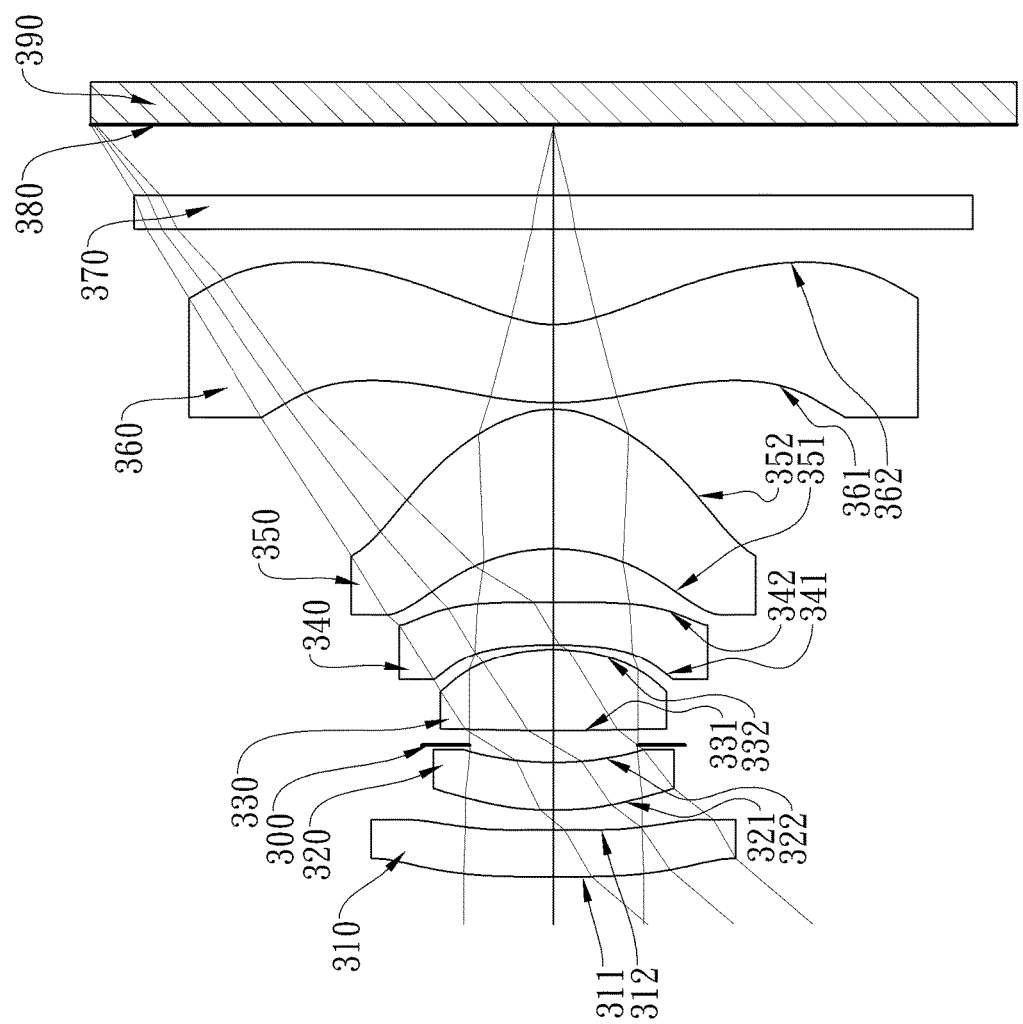
FIG. 3A is a schematic view of an image capturing apparatus according to the 3rd embodiment of the present disclosure.
Figure 3B:
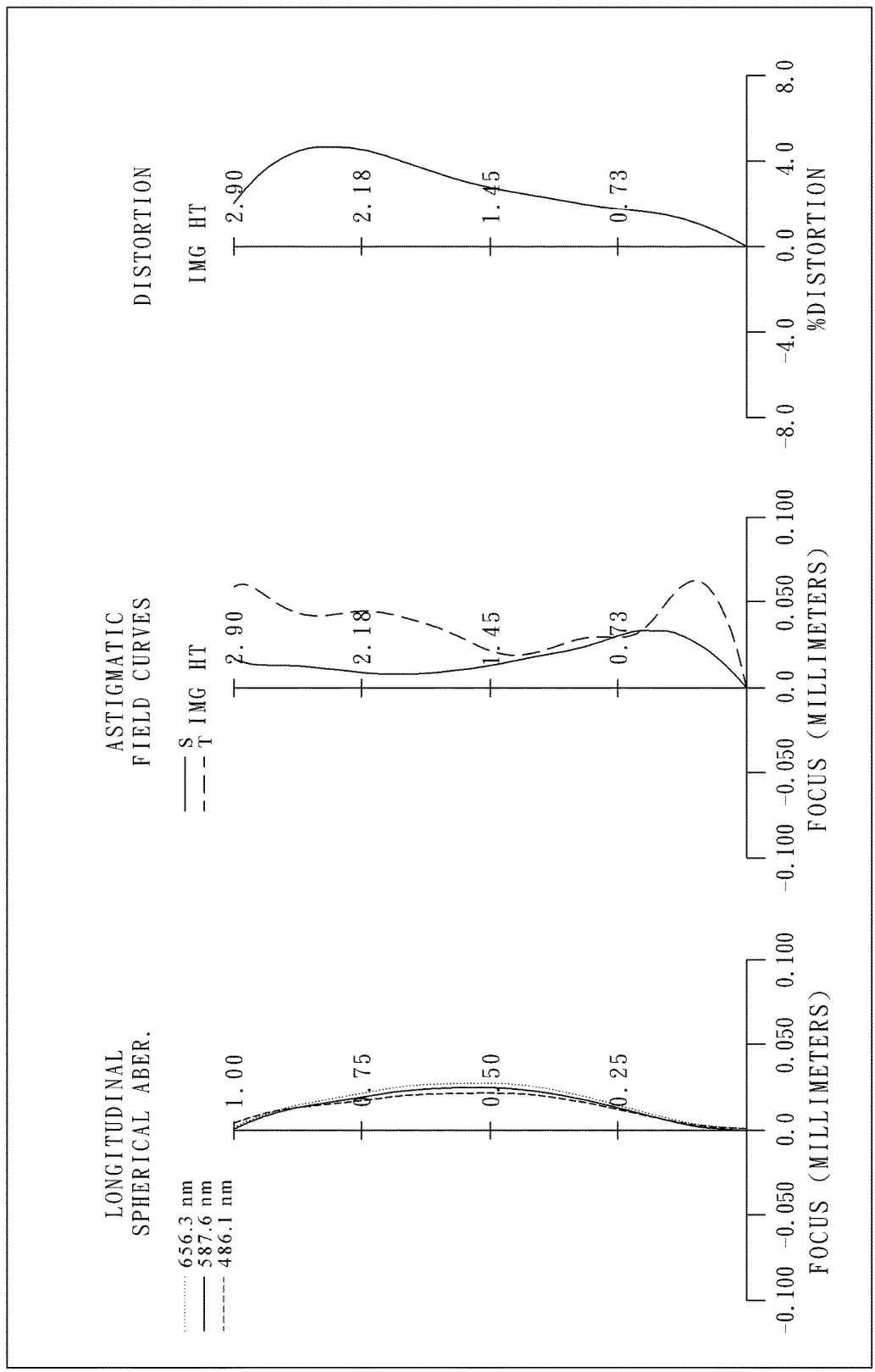
FIG. 3B shows longitudinal spherical aberration curves, astigmatic field curves and a distortion curve of the image capturing apparatus according to the 3rd embodiment.

FIG. 3A is a schematic view of an image capturing apparatus according to the 3rd embodiment of the present disclosure. FIG. 3B shows, in order from left to right, longitudinal spherical aberration curves, astigmatic field curves and a distortion curve of the image capturing apparatus according to the 3rd embodiment.

In FIG. 3A, the image capturing apparatus includes an optical imaging lens (not otherwise herein labeled) of the present disclosure and an image sensor 390. The optical imaging lens includes, in order from an object side to an image side, a first lens element 310, a second lens element 320, an aperture stop 300, a third lens element 330, a fourth lens element 340, a fifth lens element 350 and a sixth lens element 360.

The first lens element 310 with positive refractive power has an object-side surface 311 being convex in a paraxial region thereof, an image-side surface 312 being convex in a paraxial region thereof, both the object-side surface 311 and the image-side surface 312 being aspheric, and at least one concave shape in an off-axial region on the image-side surface 312. The first lens element 310 is made of plastic material.

The second lens element 320 with positive refractive power has an object-side surface 321 being convex in a paraxial region thereof, an image-side surface 322 being concave in a paraxial region thereof, and both the object-side surface 321 and the image-side surface 322 being aspheric. The second lens element 320 is made of plastic material.

The third lens element 330 with positive refractive power has an object-side surface 331 being convex in a paraxial region thereof, an image-side surface 332 being convex in a paraxial region thereof, and both the object-side surface 331 and the image-side surface 332 being aspheric. The third lens element 330 is made of plastic material.

The fourth lens element 340 with negative refractive power has an object-side surface 341 being concave in a paraxial region thereof, an image-side surface 342 being convex in a paraxial region thereof, and both the object-side surface 341 and the image-side surface 342 being aspheric. The fourth lens element 340 is made of plastic material.

The fifth lens element 350 with positive refractive power has an object-side surface 351 being concave in a paraxial region thereof, an image-side surface 352 being convex in a paraxial region thereof, and both the object-side surface 351 and the image-side surface 352 being aspheric The fifth lens element 350 is made of plastic material.

The sixth lens element 360 with negative refractive power has an object-side surface 361 being convex in a paraxial region thereof, an image-side surface 362 being concave in a paraxial region thereof, both the object-side surface 361 and the image-side surface 362 being aspheric, and at least one convex shape in an off-axial region on the image-side surface 362. The sixth lens element 360 is made of plastic material.

The optical imaging lens further includes an IR cut filter 370 located between the sixth lens element 360 and an image surface 380. The IR cut filter 370 is made of glass material and will not affect the focal length of the optical imaging lens. The image sensor 390 is disposed on or near the image surface 380 of the optical imaging lens.

The detailed optical data of the 3rd embodiment are shown in TABLE 6, and the aspheric surface data are shown in TABLE 7, wherein the units of the curvature radius, the thickness and the focal length are expressed in mm, and HFOV is a half of the maximal field of view.

TABLE 6

| (3rd Embodiment) f = 2.41 mm, Fno = 2.12, HFOV = 49.5 deg. | | | | | | | |
|---|---|---|---|---|---|---|---|
| Surface # | | | Curvature Radius | Thickness | Material | Index | Abbe # | Focal Length |
| 0 | Object | | Plano | Infinity | | | | |
| 1 | Lens 1 | | 99.075 ASP | 0.295 | Plastic | 1.544 | 55.9 | 23.42 |
| 2 | | | −14.593 ASP | 0.124 | | | | |
| 3 | Lens 2 | | 2.141 ASP | 0.300 | Plastic | 1.660 | 20.4 | 416.81 |

TABLE 6-continued (3rd Embodiment)
f = 2.41 mm, Fno = 2.12, HFOV = 49.5 deg.

| Surface # | | Curvature Radius | | Thickness | Material | Index | Abbe # | Focal Length |
|---|---|---|---|---|---|---|---|---|
| 4 | | 2.037 | ASP | 0.110 | | | | |
| 5 | Ape. Stop | Plano | | 0.091 | | | | |
| 6 | Lens 3 | 11.460 | ASP | 0.514 | Plastic | 1.544 | 55.9 | 2.19 |
| 7 | | −1.310 | ASP | 0.030 | | | | |
| 8 | Lens 4 | −3.187 | ASP | 0.270 | Plastic | 1.660 | 20.4 | −4.99 |
| 9 | | −100.000 | ASP | 0.337 | | | | |
| 10 | Lens 5 | −1.194 | ASP | 0.880 | Plastic | 1.544 | 55.9 | 1.67 |
| 11 | | −0.650 | ASP | 0.040 | | | | |
| 12 | Lens 6 | 1.881 | ASP | 0.499 | Plastic | 1.633 | 23.4 | −2.23 |
| 13 | | 0.723 | ASP | 0.600 | | | | |
| 14 | IR Cut Filter | Plano | | 0.210 | Glass | 1.517 | 64.2 | — |
| 15 | | Plano | | 0.449 | | | | |
| 16 | Image Surface | Plano | | — | | | | |

Note:
Reference wavelength is d-line 587.6 nm
The effective radius of Surface 10 is 1.050 mm.

TABLE 7

Aspheric Coefficients

| Surface # | 1 | 2 | 3 | 4 |
|---|---|---|---|---|
| k = | 9.0000E+01 | −9.0000E+01 | 4.7589E+00 | −2.5682E+01 |
| A4= | 2.1666E−01 | 5.0885E−01 | 1.9857E−01 | 4.1019E−01 |
| A6 = | −2.6069E−01 | −1.0855E+00 | −1.3740E+00 | −1.3974E+00 |
| A8 = | 4.5101E−01 | 2.2273E+00 | 5.0441E+00 | 3.9342E+00 |
| A10 = | −7.0644E−01 | −4.0349E+00 | −1.6729E+01 | −1.5169E+00 |
| A12 = | 6.6988E−01 | 4.5116E+00 | 3.2744E+01 | −4.6850E+01 |
| A14 = | −3.5426E−01 | −2.7107E+00 | −3.3336E+01 | 1.8173E+02 |
| A16 = | 7.8407E−02 | 6.7888E−01 | 1.3949E+01 | −1.9439E+02 |

| Surface # | 6 | 7 | 8 | 9 |
|---|---|---|---|---|
| k = | −1.3651E+01 | −2.6979E−01 | −6.6605E+00 | −2.4486E+00 |
| A4 = | −1.9968E−03 | 1.9273E−01 | −9.7498E−02 | −1.6623E−01 |
| A6 = | −6.2848E−02 | −3.8815E+00 | −2.0956E+00 | −1.0534E−01 |
| A8 = | −1.7559E+00 | 2.3151E+01 | 7.7468E+00 | 8.7608E−02 |
| A10 = | 1.6342E+01 | −9.3359E+01 | −1.9571E+01 | 2.7920E−01 |
| A12 = | −7.5981E+01 | 2.2541E+02 | 2.6479E+01 | −7.9597E−01 |
| A14 = | 1.6702E+02 | −2.9906E+02 | −1.6551E+01 | 7.5299E−01 |
| A16 = | −1.2797E+02 | 1.6987E+02 | 5.2671E+00 | −1.9558E−01 |

| Surface # | 10 | 11 | 12 | 13 |
|---|---|---|---|---|
| k = | −5.8286E−01 | −3.2563E+00 | −1.7261E−01 | −5.0411E+00 |
| A4 = | −7.0786E−02 | −4.2264E−01 | −2.0252E−01 | −5.8533E−02 |
| A6 = | 3.9143E−01 | 3.1097E−01 | 9.4968E−02 | 6.4653E−03 |
| A8 = | −2.4296E+00 | 1.1304E+00 | −7.0732E−02 | 4.3739E−03 |
| A10 = | 6.5122E+00 | −8.3211E+00 | 4.4653E−02 | −2.4599E−03 |
| A12 = | −8.1916E+00 | 1.0172E+00 | −1.7928E−02 | 5.2753E−04 |
| A14 = | 5.0788E+00 | −4.9806E−01 | 3.7139E−03 | −5.5998E−05 |
| A16 = | −1.2416E+00 | 8.7997E−02 | −3.0111E−04 | 2.5455E−06 |

In the 3rd embodiment, the equation of the aspheric surface profiles of the aforementioned lens elements is the same as the equation of the 1st embodiment. Also, the definitions of these parameters shown in TABLE 8 below are the same as those stated in the 1st embodiment with corresponding values for the 3rd embodiment, so an explanation in this regard will not be provided again.

Moreover, these parameters can be calculated from TABLE 6 and TABLE 7 and satisfy the conditions stated in TABLE 8.

TABLE 8

3rd Embodiment

| | | | |
|---|---|---|---|
| f [mm] | 2.41 | f1/R1 | 0.24 |
| f/EPD | 2.12 | \|f1\|/R2 | −1.60 |
| HFOV [deg.] | 49.5 | f3/f1 | 0.09 |
| T45/T56 | 8.43 | f3/f2 | 0.01 |
| Td/ΣCT | 1.27 | \|f4/f3\| | 2.28 |
| TL/ImgH | 1.64 | f/ImgH | 0.83 |
| Y11/Y31 | 2.05 | f/R2 | −0.17 |
| R2/R5 | −1.27 | f/f1 | 0.10 |
| R3/R4 | 1.05 | f/f2 | 0.01 |
| R9/R10 | 1.84 | | |

4th Embodiment

Figure 4A:
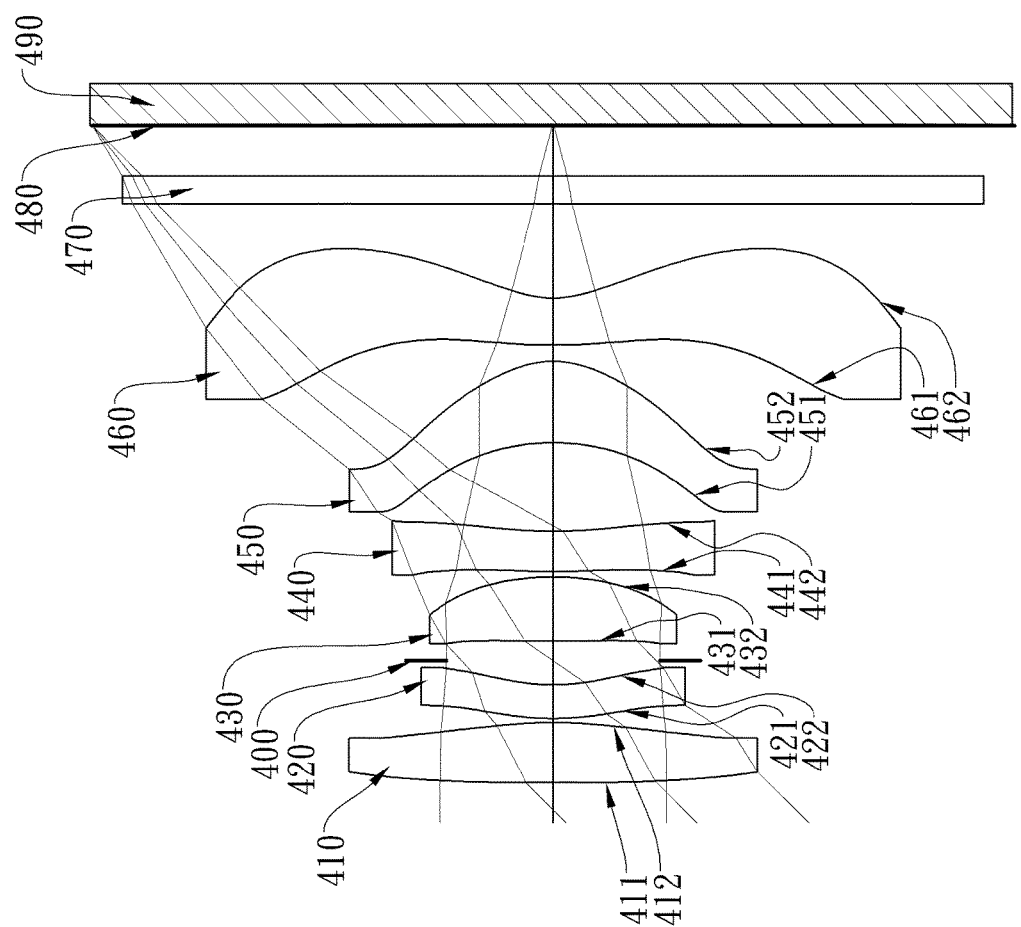
FIG. 4A is a schematic view of an image capturing apparatus according to the 4th embodiment of the present disclosure.
Figure 4B:
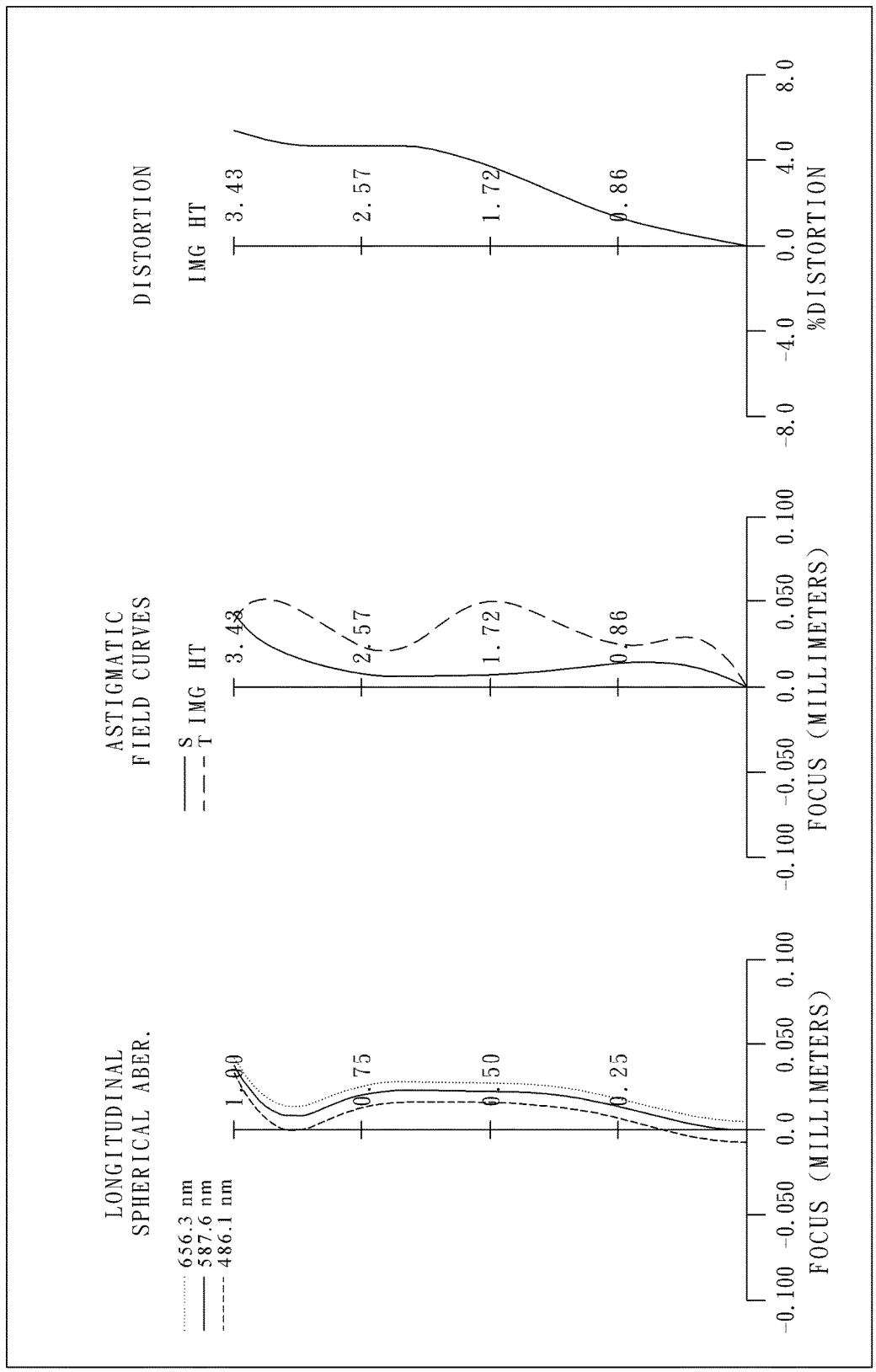
FIG. 4B shows longitudinal spherical aberration curves, astigmatic field curves and a distortion curve of the image capturing apparatus according to the 4th embodiment.

FIG. 4A is a schematic view of an image capturing apparatus according to the 4th embodiment of the present disclosure. FIG. 4B shows, in order from left to right, longitudinal spherical aberration curves, astigmatic field curves and a distortion curve of the image capturing apparatus according to the 4th embodiment.

In FIG. 4A, the image capturing apparatus includes an optical imaging lens (not otherwise herein labeled) of the present disclosure and an image sensor 490. The optical imaging lens includes, in order from an object side to an image side, a first lens element 410, a second lens element 420, an aperture stop 400, a third lens element 430, a fourth lens element 440, a fifth lens element 450 and a sixth lens element 460.

The first lens element 410 with positive refractive power has an object-side surface 411 being convex in a paraxial region thereof, an image-side surface 412 being convex in a paraxial region thereof, both the object-side surface 411 and the image-side surface 412 being aspheric, and at least one concave shape in an off-axial region on the image-side surface 412. The first lens element 410 is made of plastic material.

The second lens element 420 with negative refractive power has an object-side surface 421 being convex in a paraxial region thereof, an image-side surface 422 being concave in a paraxial region thereof, and both the object-side surface 421 and the image-side surface 422 being aspheric. The second lens element 420 is made of plastic material.

The third lens element 430 with positive refractive power has an object-side surface 431 being convex in a paraxial region thereof, an image-side surface 432 being convex in a paraxial region thereof, and both the object-side surface 431 and the image-side surface 432 being aspheric. The third lens element 430 is made of plastic material.

The fourth lens element 440 with negative refractive power has an object-side surface 441 being convex in a paraxial region thereof, an image-side surface 442 being concave in a paraxial region thereof, and both the object-side surface 441 and the image-side surface 442 being aspheric. The fourth lens element 440 is made of plastic material.

The fifth lens element 450 with positive refractive power has an object-side surface 451 being concave in a paraxial region thereof, an image-side surface 452 being convex in a paraxial region thereof, and both the object-side surface 451 and the image-side surface 452 being aspheric The fifth lens element 450 is made of plastic material.

The sixth lens element 460 with negative refractive power has an object-side surface 461 being convex in a paraxial region thereof, an image-side surface 462 being concave in a paraxial region thereof, both the object-side surface 461 and the image-side surface 462 being aspheric, and at least one convex shape in an off-axial region on the image-side surface 462. The sixth lens element 460 is made of plastic material.

The optical imaging lens further includes an IR cut filter 470 located between the sixth lens element 460 and an image surface 480. The IR cut filter 470 is made of glass material and will not affect the focal length of the optical imaging lens. The image sensor 490 is disposed on or near the image surface 480 of the optical imaging lens.

The detailed optical data of the 4th embodiment are shown in TABLE 9, and the aspheric surface data are shown in TABLE 10, wherein the units of the curvature radius, the thickness and the focal length are expressed in mm, and HFOV is a half of the maximal field of view.

TABLE 9

(4th Embodiment)
f = 3.24 mm, Fno = 1.92, HFOV = 45.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 44.710 ASP | 0.451 | Plastic | 1.544 | 55.9 | 5.42 |
| 2 | | −3.145 ASP | 0.030 | | | | |
| 3 | Lens 2 | 2.024 ASP | 0.250 | Plastic | 1.666 | 20.3 | −8.71 |
| 4 | | 1.426 ASP | 0.181 | | | | |
| 5 | Ape. Stop | Plano | 0.146 | | | | |
| 6 | Lens 3 | 27.330 ASP | 0.475 | Plastic | 1.544 | 55.9 | 3.86 |
| 7 | | −2.260 ASP | 0.040 | | | | |
| 8 | Lens 4 | 4.944 ASP | 0.300 | Plastic | 1.666 | 20.3 | −15.20 |
| 9 | | 3.241 ASP | 0.664 | | | | |
| 10 | Lens 5 | −1.680 ASP | 0.606 | Plastic | 1.544 | 55.9 | 1.75 |
| 11 | | −0.685 ASP | 0.119 | | | | |
| 12 | Lens 6 | 3.968 ASP | 0.350 | Plastic | 1.552 | 49.0 | −1.68 |
| 13 | | 0.727 ASP | 0.700 | | | | |
| 14 | IR Cut Filter | Plano | 0.210 | Glass | 1.517 | 64.2 | — |
| 15 | | Plano | 0.377 | | | | |
| 16 | Image Surface | Plano | — | | | | |

Note:
Reference wavelength is d-line 587.6 nm
The effective radius of Surface 1 is 1.520 mm.
The effective radius of Surface 7 is 0.920 mm.

TABLE 10

Aspheric Coefficients

| Surface # | 1 | 2 | 3 | 4 |
|---|---|---|---|---|
| k = | −9.9000E+01 | −3.8950E+01 | −8.8674E+00 | −5.6547E+00 |
| A4 = | 2.2950E−02 | 2.9540E−02 | −4.8049E−02 | −1.5726E−01 |
| A6 = | −1.3738E−02 | −3.3682E−02 | −2.3685E−02 | 1.5930E−01 |
| A8 = | 8.1280E−03 | 2.4616E−02 | −1.7319E−01 | −4.3446E−01 |
| A10 = | −3.4922E−03 | −1.0135E−02 | 2.4791E−01 | 4.5538E−01 |
| A12 = | 6.6949E−04 | 1.9634E−03 | −8.7405E−02 | −5.6403E−02 |

| Surface # | 6 | 7 | 8 | 9 |
|---|---|---|---|---|
| k = | −1.9251E+01 | −1.3850E−01 | −2.6269E+00 | −7.2683E+01 |
| A4 = | −1.1437E−02 | −1.6409E−01 | −2.3629E−01 | 1.1807E−01 |
| A6 = | −1.1335E−01 | 2.3158E−01 | 3.3386E−01 | −5.0217E−01 |
| A8 = | 4.1491E−02 | −3.5967E−01 | −6.0069E−01 | 1.0383E+00 |
| A10 = | −3.1401E−01 | −2.7351E−02 | 6.8084E−01 | −1.4420E+00 |
| A12 = | 5.8293E−01 | 5.0972E−01 | −3.1733E−01 | 1.2482E+00 |
| A14 = | −2.3905E−01 | −3.2962E−01 | 2.6698E−02 | −5.9008E−01 |
| A16 = | | | | 1.1580E−01 |

| Surface # | 10 | 11 | 12 | 13 |
|---|---|---|---|---|
| k = | −1.1707E+00 | −3.9434E+00 | −2.5396E+01 | −5.4117E+00 |
| A4 = | −1.6281E−01 | −3.4277E−01 | −3.6444E−02 | −6.5469E−02 |
| A6 = | 5.4843E−01 | 5.5460E−01 | −6.5568E−02 | 1.7098E−02 |
| A8 = | −1.5123E+00 | −7.7418E−01 | 6.1009E−02 | −2.7935E−03 |
| A10 = | 2.2544E+00 | 6.4144E−01 | −2.5103E−02 | 4.6535E−05 |
| A12 = | −1.8390E+00 | −2.7570E−01 | 5.4661E−03 | 5.6162E−05 |
| A14 = | 7.7816E−01 | 5.9387E−02 | −6.0079E−04 | −9.4386E−06 |
| A16 = | −1.3144E−01 | −5.2183E−03 | 2.6141E−05 | 5.2526E−07 |

In the 4th embodiment, the equation of the aspheric surface profiles of the aforementioned lens elements is the same as the equation of the 1st embodiment. Also, the definitions of these parameters shown in TABLE 11 below are the same as those stated in the 1st embodiment with corresponding values for the 4th embodiment, so an explanation in this regard will not be provided again.

Moreover, these parameters can be calculated from TABLE 9 and TABLE 10 and satisfy the conditions stated in TABLE 11.

TABLE 11

4th Embodiment

| | | | |
|---|---|---|---|
| f [mm] | 3.24 | f1/R1 | 0.12 |
| f/EPD | 1.92 | \|f1\|/R2 | −1.72 |
| HFOV [deg.] | 45.0 | f3/f1 | 0.71 |
| T45/T56 | 5.58 | f3/f2 | −0.44 |
| Td/ΣCT | 1.49 | \|f4/f3\| | 3.94 |
| TL/ImgH | 1.43 | f/ImgH | 0.94 |
| Y11/Y31 | 1.90 | f/R2 | −1.03 |
| R2/R5 | −0.12 | f/f1 | 0.60 |
| R3/R4 | 1.42 | f/f2 | −0.37 |
| R9/R10 | 2.45 | | |

5th Embodiment

Figure 5A:
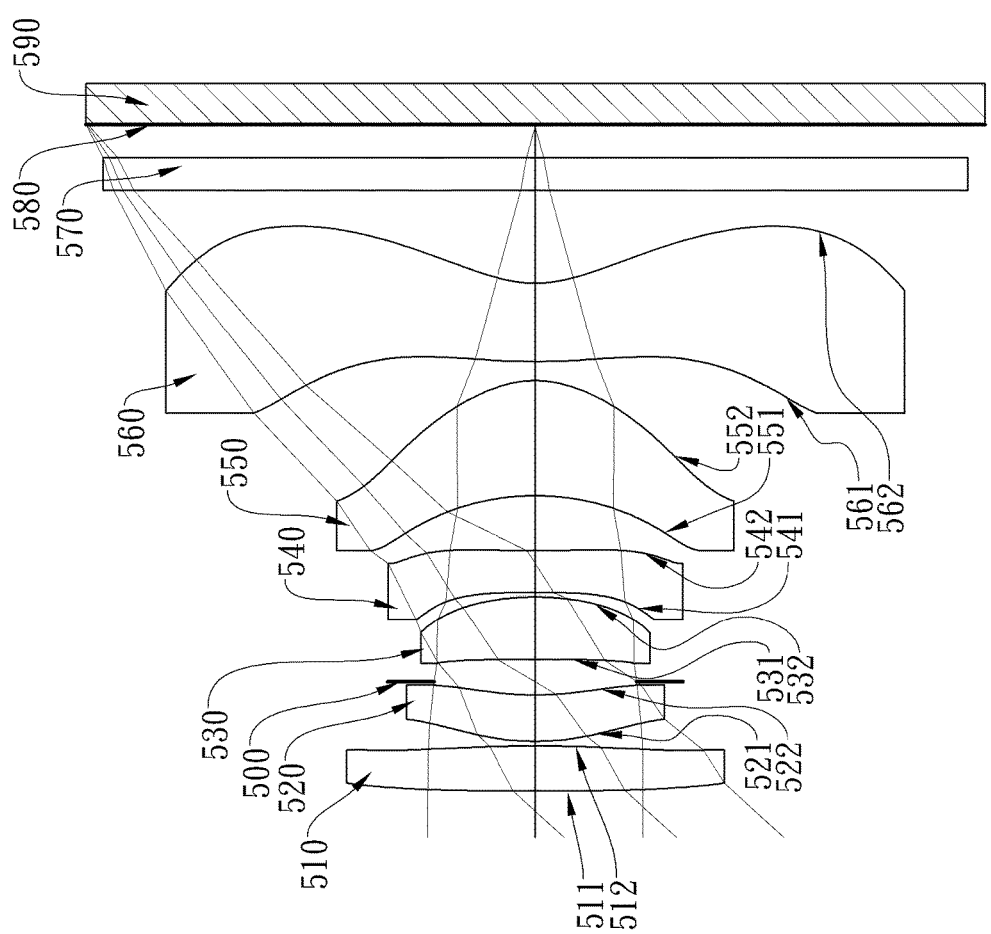
FIG. 5A is a schematic view of an image capturing apparatus according to the 5th embodiment of the present disclosure.
Figure 5B:
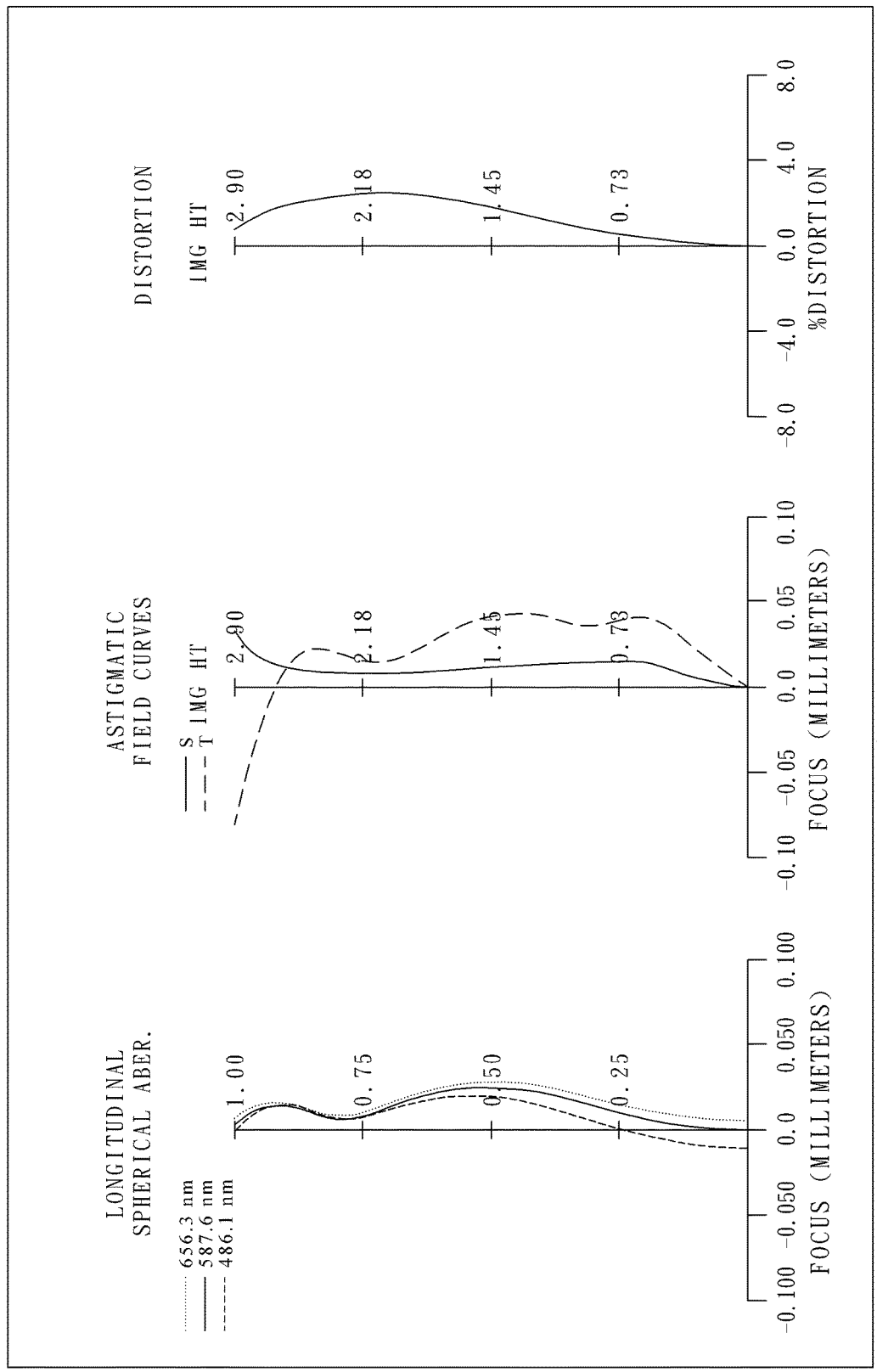
FIG. 5B shows longitudinal spherical aberration curves, astigmatic field curves and a distortion curve of the image capturing apparatus according to the 5th embodiment.

FIG. 5A is a schematic view of an image capturing apparatus according to the 5th embodiment of the present disclosure. FIG. 5B shows, in order from left to right, longitudinal spherical aberration curves, astigmatic field curves and a distortion curve of the image capturing apparatus according to the 5th embodiment.

In FIG. 5A, the image capturing apparatus includes an optical imaging lens (not otherwise herein labeled) of the present disclosure and an image sensor 590. The optical imaging lens includes, in order from an object side to an image side, a first lens element 510, a second lens element 520, an aperture stop 500, a third lens element 530, a fourth lens element 540, a fifth lens element 550 and a sixth lens element 560.

The first lens element 510 with positive refractive power has an object-side surface 511 being convex in a paraxial region thereof, an image-side surface 512 being convex in a paraxial region thereof, both the object-side surface 511 and the image-side surface 512 being aspheric, and at least one concave shape in an off-axial region on the image-side surface 512. The first lens element 510 is made of plastic material.

The second lens element 520 with positive refractive power has an object-side surface 521 being convex in a paraxial region thereof, an image-side surface 522 being concave in a paraxial region thereof, and both the object-side surface 521 and the image-side surface 522 being aspheric. The second lens element 520 is made of plastic material.

The third lens element 530 with positive refractive power has an object-side surface 531 being concave in a paraxial region thereof, an image-side surface 532 being convex in a paraxial region thereof, and both the object-side surface 531 and the image-side surface 532 being aspheric. The third lens element 530 is made of plastic material.

The fourth lens element 540 with negative refractive power has an object-side surface 541 being concave in a paraxial region thereof, an image-side surface 542 being concave in a paraxial region thereof, and both the object-side surface 541 and the image-side surface 542 being aspheric. The fourth lens element 540 is made of plastic material.

The fifth lens element 550 with positive refractive power has an object-side surface 551 being concave in a paraxial region thereof, an image-side surface 552 being convex in a paraxial region thereof, and both the object-side surface 551 and the image-side surface 552 being aspheric The fifth lens element 550 is made of plastic material.

The sixth lens element 560 with negative refractive power has an object-side surface 561 being convex in a paraxial region thereof, an image-side surface 562 being concave in a paraxial region thereof, both the object-side surface 561 and the image-side surface 562 being aspheric, and at least one convex shape in an off-axial region on the image-side surface 562. The sixth lens element 560 is made of plastic material.

The optical imaging lens further includes an IR cut filter 570 located between the sixth lens element 560 and an image surface 580. The IR cut filter 570 is made of glass material and will not affect the focal length of the optical imaging lens. The image sensor 590 is disposed on or near the image surface 580 of the optical imaging lens.

The detailed optical data of the 5th embodiment are shown in TABLE 12, and the aspheric surface data are shown in TABLE 13, wherein the units of the curvature radius, the thickness and the focal length are expressed in mm, and HFOV is a half of the maximal field of view.

TABLE 12

(5th Embodiment)
f = 2.63 mm, Fno = 1.89, HFOV = 47.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1000.000 ASP | 0.290 | Plastic | 1.544 | 55.9 | 17.52 |
| 2 | | −9.616 ASP | 0.030 | | | | |
| 3 | Lens 2 | 1.529 ASP | 0.300 | Plastic | 1.544 | 55.9 | 9.26 |
| 4 | | 2.044 ASP | 0.085 | | | | |
| 5 | Ape. Stop | Plano | 0.143 | | | | |
| 6 | Lens 3 | −50.000 ASP | 0.407 | Plastic | 1.544 | 55.9 | 3.71 |
| 7 | | −1.943 ASP | 0.030 | | | | |
| 8 | Lens 4 | −18.947 ASP | 0.270 | Plastic | 1.660 | 20.4 | −7.22 |
| 9 | | 6.399 ASP | 0.356 | | | | |
| 10 | Lens 5 | −1.628 ASP | 0.743 | Plastic | 1.544 | 55.9 | 1.72 |
| 11 | | −0.688 ASP | 0.124 | | | | |
| 12 | Lens 6 | 4.391 ASP | 0.509 | Plastic | 1.547 | 40.9 | −1.79 |

TABLE 12-continued (5th Embodiment)
f = 2.63 mm, Fno = 1.89, HFOV = 47.5 deg.

| Surface # | | Curvature Radius | Thickness | Material | Index | Abbe # | Focal Length |
|---|---|---|---|---|---|---|---|
| 13 | | 0.767 ASP | 0.600 | | | | |
| 14 | IR Cut Filter | Plano | 0.210 | Glass | 1.517 | 64.2 | — |
| 15 | | Plano | 0.215 | | | | |
| 16 | Image Surface | Plano | — | | | | |

Note:
Reference wavelength is d-line 587.6 nm
The effective radius of the Surface 7 is 0.740 mm.

TABLE 13

Aspheric Coefficients

| Surface # | 1 | 2 | 3 | 4 |
|---|---|---|---|---|
| k = | 9.0000E+01 | −9.0000E+01 | −1.4328E+00 | −2.5682E+01 |
| A4 = | 6.1008E−02 | 1.1694E−02 | −1.3207E−01 | 1.6593E−01 |
| A6 = | −6.5987E−02 | −1.5979E−02 | 3.4350E−02 | −8.1817E−01 |
| A8 = | 4.0640E−02 | 2.4028E−02 | −2.2226E−01 | 7.1790E−01 |
| A10 = | −9.1123E−03 | −5.8061E−03 | 1.7213E−01 | |

| Surface # | 6 | 7 | 8 | 9 |
|---|---|---|---|---|
| k = | −1.3651E+01 | −5.5478E−01 | −6.6605E+00 | −2.4486E+01 |
| A4 = | −9.9837E−03 | −2.6561E−01 | −5.1132E−01 | −2.1475E−01 |
| A6 = | −3.2052E−01 | 2.2800E−01 | 5.7324E−01 | 1.3636E−02 |
| A8 = | 4.4651E−01 | −5.9142E−01 | −2.6864E+00 | −1.3521E−01 |
| A10 = | −7.1234E−01 | 3.5443E−01 | 7.5971E+00 | 5.9454E−01 |
| A12 = | | −3.6054E−01 | −1.2976E+01 | −1.1156E+00 |
| A14 = | | | 9.2304E+00 | 7.2944E−01 |

| Surface # | 10 | 11 | 12 | 13 |
|---|---|---|---|---|
| k = | 1.8462E−01 | −2.4086E+00 | 1.5610E+00 | −5.0714E+00 |
| A4 = | −8.3290E−02 | −4.2080E−02 | −8.3568E−02 | −7.0014E−02 |
| A6 = | 8.0594E−01 | −4.2246E−01 | −9.3775E−02 | 1.8635E−02 |
| A8 = | −3.6670E+00 | 1.0811E+00 | 1.1473E−01 | −2.2786E−03 |
| A10 = | 8.4280E+00 | −1.6756E+00 | −5.8565E−02 | −4.5483E−04 |
| A12 = | −1.0400E+01 | 1.5266E+00 | 1.5320E−02 | 1.7952E−04 |
| A14 = | 6.5650E+00 | −6.8905E−01 | −1.9121E−03 | −2.3256E−05 |
| A16 = | −1.6342E+00 | 1.1922E−01 | 8.4922E−05 | 1.1639E−06 |

In the 5th embodiment, the equation of the aspheric surface profiles of the aforementioned lens elements is the same as the equation of the 1st embodiment. Also, the definitions of these parameters shown in TABLE 14 below are the same as those stated in the 1st embodiment with corresponding values for the 5th embodiment, so an explanation in this regard will not be provided again.

Moreover, these parameters can be calculated from TABLE 12 and TABLE 13 and satisfy the conditions stated in TABLE 14.

TABLE 14

5th Embodiment

| f [mm] | 2.63 | f1/R1 | 0.02 |
|---|---|---|---|
| f/EPD | 1.89 | |f1|/R2 | −1.82 |
| HFOV [deg.] | 47.5 | f3/f1 | 0.21 |
| T45/T56 | 2.87 | f3/f2 | 0.40 |
| Td/ΣCT | 1.30 | |f4/f3| | 1.95 |
| TL/ImgH | 1.49 | f/ImgH | 0.91 |
| Y11/Y31 | 1.90 | f/R2 | −0.27 |
| R2/R5 | 0.19 | f/f1 | 0.15 |
| R3/R4 | 0.75 | f/f2 | 0.28 |
| R9/R10 | 2.36 | | |

6th Embodiment

Figure 6A:
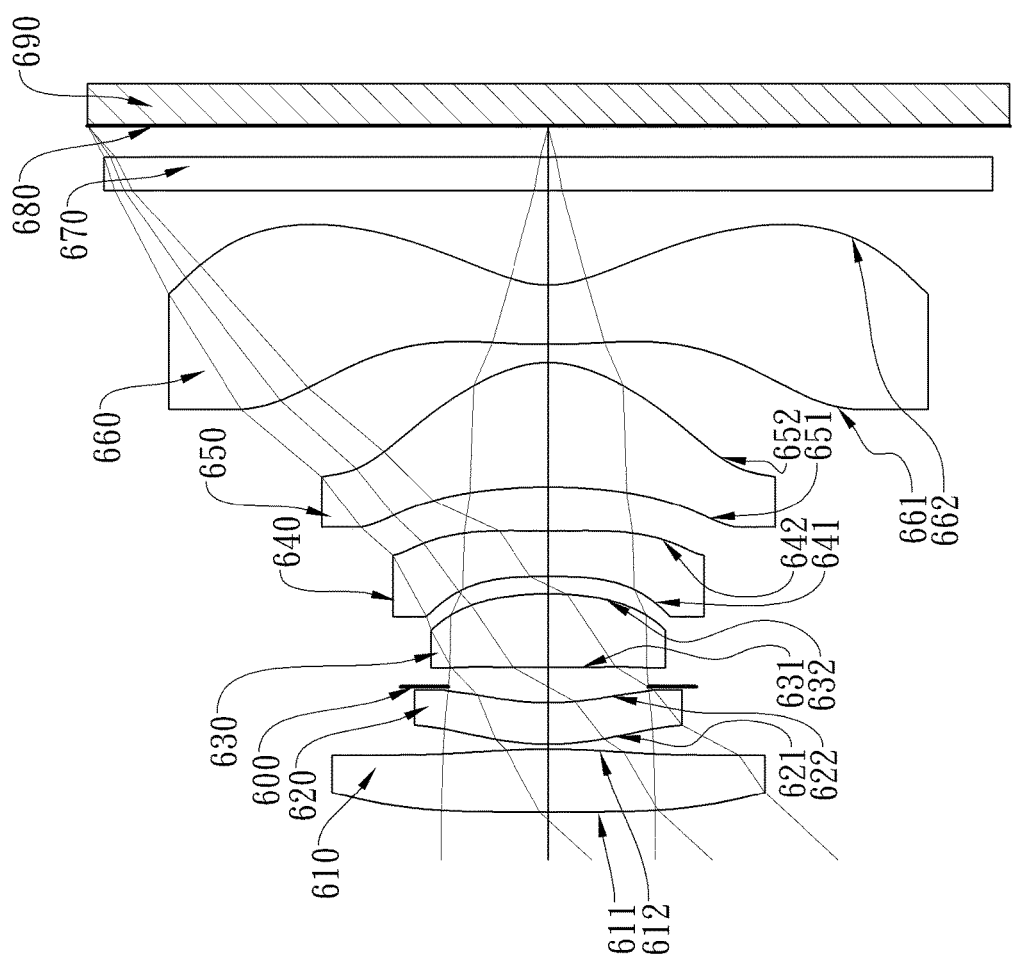
FIG. 6A is a schematic view of an image capturing apparatus according to the 6th embodiment of the present disclosure.
Figure 6B:
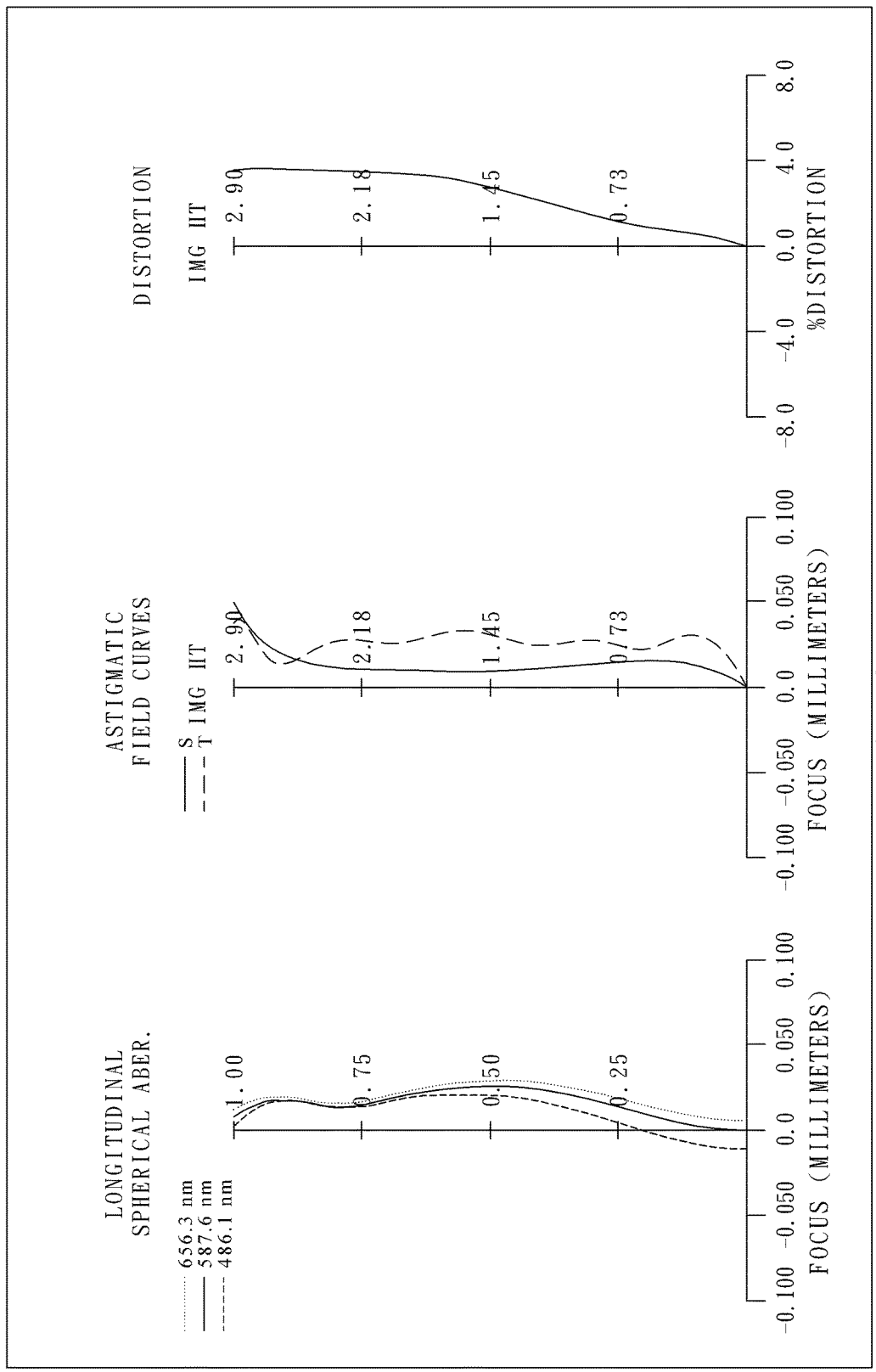
FIG. 6B shows longitudinal spherical aberration curves, astigmatic field curves and a distortion curve of the image capturing apparatus according to the 6th embodiment.

FIG. 6A is a schematic view of an image capturing apparatus according to the 6th embodiment of the present disclosure. FIG. 6B shows, in order from left to right, longitudinal spherical aberration curves, astigmatic field curves and a distortion curve of the image capturing apparatus according to the 6th embodiment.

In FIG. 6A, the image capturing apparatus includes an optical imaging lens (not otherwise herein labeled) of the present disclosure and an image sensor 690. The optical imaging lens includes, in order from an object side to an image side, a first lens element 610, a second lens element 620, an aperture stop 600, a third lens element 630, a fourth lens element 640, a fifth lens element 650 and a sixth lens element 660.

The first lens element 610 with positive refractive power has an object-side surface 611 being convex in a paraxial region thereof, an image-side surface 612 being convex in a paraxial region thereof, both the object-side surface 611 and the image-side surface 612 being aspheric, and at least one concave shape in an off-axial region on the image-side surface 612. The first lens element 610 is made of plastic material.

The second lens element 620 with negative refractive power has an object-side surface 621 being convex in a paraxial region thereof, an image-side surface 622 being concave in a paraxial region thereof, and both the object-side surface 621 and the image-side surface 622 being aspheric. The second lens element 620 is made of plastic material.

The third lens element 630 with positive refractive power has an object-side surface 631 being convex in a paraxial region thereof, an image-side surface 632 being convex in a paraxial region thereof, and both the object-side surface 631 and the image-side surface 632 being aspheric. The third lens element 630 is made of plastic material.

The fourth lens element 640 with negative refractive power has an object-side surface 641 being concave in a paraxial region thereof, an image-side surface 642 being concave in a paraxial region thereof, and both the object-side surface 641 and the image-side surface 642 being aspheric. The fourth lens element 640 is made of plastic material.

The fifth lens element 650 with positive refractive power has an object-side surface 651 being concave in a paraxial region thereof, an image-side surface 652 being convex in a paraxial region thereof, and both the object-side surface 651 and the image-side surface 652 being aspheric The fifth lens element 650 is made of plastic material.

The sixth lens element 660 with negative refractive power has an object-side surface 661 being convex in a paraxial region thereof, an image-side surface 662 being concave in a paraxial region thereof, both the object-side surface 661 and the image-side surface 662 being aspheric, and at least one convex shape in an off-axial region on the image-side surface 662. The sixth lens element 660 is made of plastic material.

The optical imaging lens further includes an IR cut filter 670 located between the sixth lens element 660 and an image surface 680. The IR cut filter 670 is made of glass material and will not affect the focal length of the optical imaging lens. The image sensor 690 is disposed on or near the image surface 680 of the optical imaging lens.

The detailed optical data of the 6th embodiment are shown in TABLE 15, and the aspheric surface data are shown in TABLE 16, wherein the units of the curvature radius, the thickness and the focal length are expressed in mm, and HFOV is a half of the maximal field of view.

TABLE 15

(6th Embodiment)
f = 2.55 mm, Fno = 1.89, HFOV = 47.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 200.000 ASP | 0.402 | Plastic | 1.544 | 55.9 | 7.22 |
| 2 | | −4.002 ASP | 0.030 | | | | |
| 3 | Lens 2 | 1.716 ASP | 0.261 | Plastic | 1.544 | 55.9 | −4899.27 |
| 4 | | 1.623 ASP | 0.101 | | | | |
| 5 | Ape. Stop | Plano | 0.121 | | | | |
| 6 | Lens 3 | 12.611 ASP | 0.464 | Plastic | 1.544 | 55.9 | 3.84 |
| 7 | | −2.467 ASP | 0.111 | | | | |
| 8 | Lens 4 | −5.926 ASP | 0.287 | Plastic | 1.660 | 20.4 | −5.58 |
| 9 | | 9.932 ASP | 0.279 | | | | |
| 10 | Lens 5 | −3.932 ASP | 0.787 | Plastic | 1.544 | 55.9 | 1.30 |
| 11 | | −0.639 ASP | 0.115 | | | | |
| 12 | Lens 6 | 4.542 ASP | 0.373 | Plastic | 1.544 | 55.9 | −1.32 |
| 13 | | 0.601 ASP | 0.600 | | | | |
| 14 | IR Cut Filter | Plano | 0.210 | Glass | 1.517 | 64.2 | — |
| 15 | | Plano | 0.197 | | | | |
| 16 | Image Surface | Plano | — | | | | |

Note:
Reference wavelength is d-line 587.6 nm
The effective radius of Surface 7 is 0.740 mm.

TABLE 16

Aspheric Coefficients

| Surface # | 1 | 2 | 3 | 4 |
|---|---|---|---|---|
| k = | −9.0000E+01 | −9.0000E+01 | −1.5334E+00 | −9.8268E+00 |
| A4 = | 6.1337E−02 | 4.3073E−02 | −1.0956E−01 | −1.2290E−01 |
| A6 = | −3.1752E−02 | −5.6019E−03 | −3.0265E−02 | 1.9449E−02 |
| A8 = | 2.3606E−02 | −1.0041E−02 | −2.7236E−01 | −6.8603E−01 |

TABLE 16-continued

Aspheric Coefficients

| | | | | |
|---|---|---|---|---|
| A10 = | −1.0709E−02 | 3.2719E−03 | 3.0534E−01 | 1.3853E+00 |
| A12 = | 1.6416E−03 | | | |

| Surface # | 6 | 7 | 8 | 9 |
|---|---|---|---|---|
| k = | −1.3651E+01 | 1.8079E+00 | 4.5522E+01 | 8.2342E+00 |
| A4 = | −8.1700E−02 | −4.9933E−01 | −8.6991E−01 | −4.9119E−01 |
| A6 = | −7.6496E−02 | 8.1342E−01 | 1.2814E+00 | 6.6911E−01 |
| A8 = | 3.0056E−03 | −1.7823E+00 | −2.6341E+00 | −8.7373E−01 |
| A10 = | −5.8859E−02 | 2.1184E+00 | 4.9707E+00 | 8.4704E−01 |
| A12 = | | −1.4683E+00 | −7.5230E+00 | −7.4263E−01 |
| A14 = | | | 5.4941E+00 | 3.8734E−01 |

| Surface # | 10 | 11 | 12 | 13 |
|---|---|---|---|---|
| k = | 4.1903E+00 | −4.1389E+00 | −6.6851E+01 | −4.5372E+00 |
| A4 = | −1.0203E−01 | −4.3243E−01 | −1.1215E−01 | −1.1549E−01 |
| A6 = | 3.4487E−01 | 8.5561E−01 | −6.8479E−02 | 5.7505E−02 |
| A8 = | −1.3107E+00 | −1.3868E+00 | 1.0995E−01 | −2.0710E−02 |
| A10 = | 2.7629E+00 | 1.4026E+00 | −6.0687E−02 | 4.5637E−03 |
| A12 = | −3.1230E+00 | −7.7023E−01 | 1.7870E−02 | −5.8702E−04 |
| A14 = | 1.7673E+00 | 2.1752E−01 | −2.7184E−03 | 3.5945E−05 |
| A16 = | −3.8866E−01 | −2.5216E−02 | 1.6657E−04 | −4.9213E−07 |

In the 6th embodiment, the equation of the aspheric surface profiles of the aforementioned lens elements is the same as the equation of the 1st embodiment. Also, the definitions of these parameters shown in TABLE 17 below are the same as those stated in the 1st embodiment with corresponding values for the 6th embodiment, so an explanation in this regard will not be provided again.

Moreover, these parameters can be calculated from TABLE 15 and TABLE 16 and satisfy the conditions stated in TABLE 17.

TABLE 17

| 6th Embodiment | | | |
|---|---|---|---|
| f [mm] | 2.55 | f1/R1 | 0.04 |
| f/EPD | 1.89 | \|f1\|/R2 | −1.80 |
| HFOV [deg.] | 47.5 | f3/f1 | 0.53 |
| T45/T56 | 2.43 | f3/f2 | −0.0008 |
| Td/ΣCT | 1.29 | \|f4/f3\| | 1.45 |
| TL/ImgH | 1.49 | f/ImgH | 0.88 |
| Y11/Y31 | 2.16 | f/R2 | −0.64 |
| R2/R5 | −0.32 | f/f1 | 0.35 |
| R3/R4 | 1.06 | f/f2 | −0.0005 |
| R9/R10 | 6.15 | | |

7th Embodiment

Figure 7A:
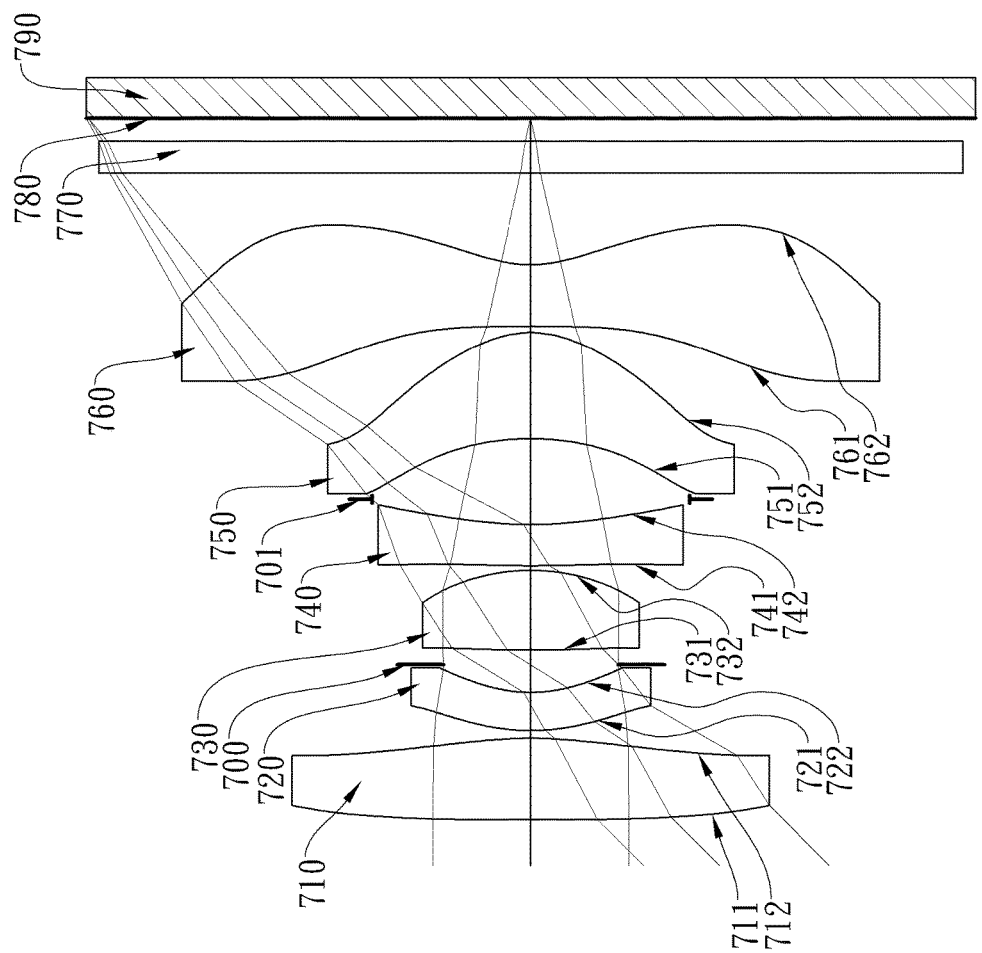
FIG. 7A is a schematic view of an image capturing apparatus according to the 7th embodiment of the present disclosure.
Figure 7B:
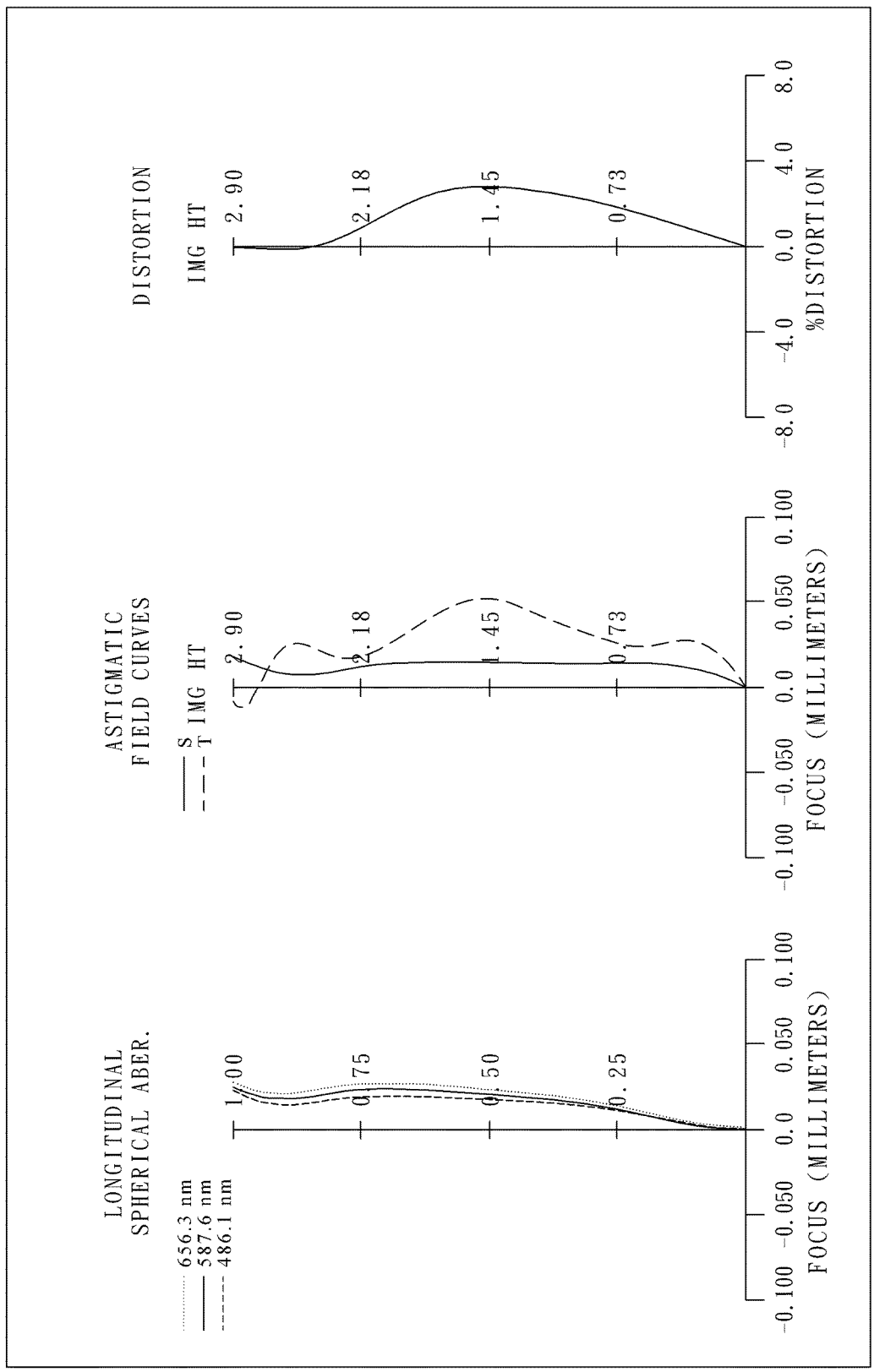
FIG. 7B shows longitudinal spherical aberration curves, astigmatic field curves and a distortion curve of the image capturing apparatus according to the 7th embodiment.

FIG. 7A is a schematic view of an image capturing apparatus according to the 7th embodiment of the present disclosure. FIG. 7B shows, in order from left to right, longitudinal spherical aberration curves, astigmatic field curves and a distortion curve of the image capturing apparatus according to the 7th embodiment.

In FIG. 7A, the image capturing apparatus includes an optical imaging lens (not otherwise herein labeled) of the present disclosure and an image sensor 790. The optical imaging lens includes, in order from an object side to an image side, a first lens element 710, a second lens element 720, an aperture stop 700, a third lens element 730, a fourth lens element 740, a stop 701, a fifth lens element 750 and a sixth lens element 760.

The first lens element 710 with positive refractive power has an object-side surface 711 being convex in a paraxial region thereof, an image-side surface 712 being convex in a paraxial region thereof, both the object-side surface 711 and the image-side surface 712 being aspheric, and at least one concave shape in an off-axial region on the image-side surface 712. The first lens element 710 is made of plastic material.

The second lens element 720 with negative refractive power has an object-side surface 721 being convex in a paraxial region thereof, an image-side surface 722 being concave in a paraxial region thereof, and both the object-side surface 721 and the image-side surface 722 being aspheric. The second lens element 720 is made of plastic material.

The third lens element 730 with positive refractive power has an object-side surface 731 being convex in a paraxial region thereof, an image-side surface 732 being convex in a paraxial region thereof, and both the object-side surface 731 and the image-side surface 732 being aspheric. The third lens element 730 is made of plastic material.

The fourth lens element 740 with negative refractive power has an object-side surface 741 being convex in a paraxial region thereof, an image-side surface 742 being concave in a paraxial region thereof, and both the object-side surface 741 and the image-side surface 742 being aspheric. The fourth lens element 740 is made of plastic material.

The fifth lens element 750 with positive refractive power has an object-side surface 751 being concave in a paraxial region thereof, an image-side surface 752 being convex in a paraxial region thereof, and both the object-side surface 751 and the image-side surface 752 being aspheric The fifth lens element 750 is made of plastic material.

The sixth lens element 760 with negative refractive power has an object-side surface 761 being concave in a paraxial region thereof, an image-side surface 762 being concave in a paraxial region thereof, both the object-side surface 761 and the image-side surface 762 being aspheric, and at least one convex shape in an off-axial region on the image-side surface 762. The sixth lens element 760 is made of plastic material.

The optical imaging lens further includes an IR cut filter 770 located between the sixth lens element 760 and an image surface 780. The IR cut filter 770 is made of glass material and will not affect the focal length of the optical imaging lens. The image sensor 790 is disposed on or near the image surface 780 of the optical imaging lens.

The detailed optical data of the 7th embodiment are shown in TABLE 18, and the aspheric surface data are shown in TABLE 19, wherein the units of the curvature radius, the thickness and the focal length are expressed in mm, and HFOV is a half of the maximal field of view.

TABLE 18

(7th Embodiment)
f = 2.89 mm, Fno = 2.25, HFOV = 45.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 57.011 ASP | 0.535 | Plastic | 1.544 | 55.9 | 4.48 |
| 2 | | −2.536 ASP | 0.050 | | | | |
| 3 | Lens 2 | 1.422 ASP | 0.250 | Plastic | 1.639 | 23.5 | −5.42 |
| 4 | | 0.939 ASP | 0.181 | | | | |
| 5 | Ape. Stop | Plano | 0.096 | | | | |
| 6 | Lens 3 | 8.983 ASP | 0.526 | Plastic | 1.544 | 55.9 | 2.20 |
| 7 | | −1.350 ASP | 0.030 | | | | |
| 8 | Lens 4 | 8.466 ASP | 0.270 | Plastic | 1.639 | 23.5 | −5.74 |
| 9 | | 2.528 ASP | 0.166 | | | | |
| 10 | Stop | Plano | 0.396 | | | | |
| 11 | Lens 5 | −1.877 ASP | 0.698 | Plastic | 1.544 | 55.9 | 1.54 |
| 12 | | −0.654 ASP | 0.040 | | | | |
| 13 | Lens 6 | −98.696 ASP | 0.404 | Plastic | 1.535 | 55.8 | −1.42 |
| 14 | | 0.764 ASP | 0.600 | | | | |
| 15 | IR Cut Filter | Plano | 0.210 | Glass | 1.517 | 64.2 | — |
| 16 | | Plano | 0.150 | | | | |
| 17 | Image Surface | Plano | — | | | | |

Note:
Reference wavelength is d-line 587.6 nm
The effective radius of Surface 10 is 1.040 mm.

TABLE 19

Aspheric Coefficients

| Surface # | 1 | 2 | 3 | 4 |
|---|---|---|---|---|
| k = | −6.3058E+01 | −5.1332E+01 | −3.8817E+00 | −3.9585E+00 |
| A4 = | 2.4474E−02 | 9.2434E−03 | 8.9277E−02 | 5.3496E−02 |
| A6 = | −1.9979E−02 | 5.9810E−04 | −3.5708E−01 | 1.6759E−01 |
| A8 = | 1.3937E−02 | 3.0246E−03 | 4.2072E−01 | −8.7486E−01 |
| A10 = | −4.7240E−03 | −3.1582E−03 | −3.8915E−01 | 1.2297E+00 |
| A12 = | 6.3190E−04 | 8.1847E−04 | 6.1788E−02 | |
| A14 = | | | | |

| Surface # | 6 | 7 | 8 | 9 |
|---|---|---|---|---|
| k = | 4.0546E+01 | −1.3244E+00 | −9.9323E+00 | −5.0000E+01 |
| A4 = | −5.0979E−02 | −8.7629E−02 | −1.7236E−01 | 1.5119E−01 |
| A6 = | −7.4311E−02 | 9.7734E−02 | 4.8997E−01 | −5.2994E−01 |
| A8 = | 2.3292E−01 | −4.9372E−01 | −1.1298E+00 | 1.3490E+00 |
| A10 = | −4.4140E−01 | 4.5088E−01 | 1.4829E+00 | −2.2878E+00 |
| A12 = | 2.8832E−02 | −2.4922E−02 | −9.7207E−01 | 2.3521E+00 |
| A14 = | 6.4804E−01 | −3.2202E−01 | 2.2093E−01 | −1.3010E+00 |
| A16 = | | | | 2.9556E−01 |

| Surface # | 11 | 12 | 13 | 14 |
|---|---|---|---|---|
| k = | −1.8679E+00 | −4.1819E+00 | 6.3498E+01 | −5.9454E+00 |
| A4 = | −2.7206E−01 | −5.2959E−01 | −1.7707E−01 | −1.4606E−01 |
| A6 = | 9.1578E−01 | 1.0490E+00 | 1.0879E−01 | 9.6360E−02 |
| A8 = | −2.7830E+00 | −1.5237E+00 | −4.6882E−02 | −4.6474E−02 |
| A10 = | 4.9859E+00 | 1.3210E+00 | 1.7023E−02 | 1.4098E−02 |
| A12 = | −4.9777E+00 | −5.9978E−01 | −4.1071E−03 | −2.7063E−03 |
| A14 = | 2.6257E+00 | 1.3153E−01 | 5.3789E−04 | 2.9816E−04 |
| A16 = | −5.6711E−01 | −1.0753E−02 | −2.8872E−05 | −1.4019E−05 |

In the 7th embodiment, the equation of the aspheric surface profiles of the aforementioned lens elements is the same as the equation of the 1st embodiment. Also, the definitions of these parameters shown in TABLE 20 below are the same as those stated in the 1st embodiment with corresponding values for the 7th embodiment, so an explanation in this regard will not be provided again.

Moreover, these parameters can be calculated from TABLE 18 and TABLE 19 and satisfy the conditions stated in TABLE 20.

TABLE 20

7th Embodiment

| f [mm] | 2.89 | f1/R1 | 0.08 |
|---|---|---|---|
| f/EPD | 2.25 | |f1|/R2 | −1.77 |
| HFOV [deg.] | 45.0 | f3/f1 | 0.49 |
| T45/T56 | 14.05 | f3/f2 | −0.41 |
| Td/ΣCT | 1.36 | |f4/f3| | 2.61 |
| TL/ImgH | 1.59 | f/ImgH | 1.00 |
| Y11/Y31 | 2.65 | f/R2 | −1.14 |
| R2/R5 | −0.28 | f/f1 | 0.65 |
| R3/R4 | 1.51 | f/f2 | −0.53 |
| R9/R10 | 2.87 | | |

8th Embodiment

Figure 8A:
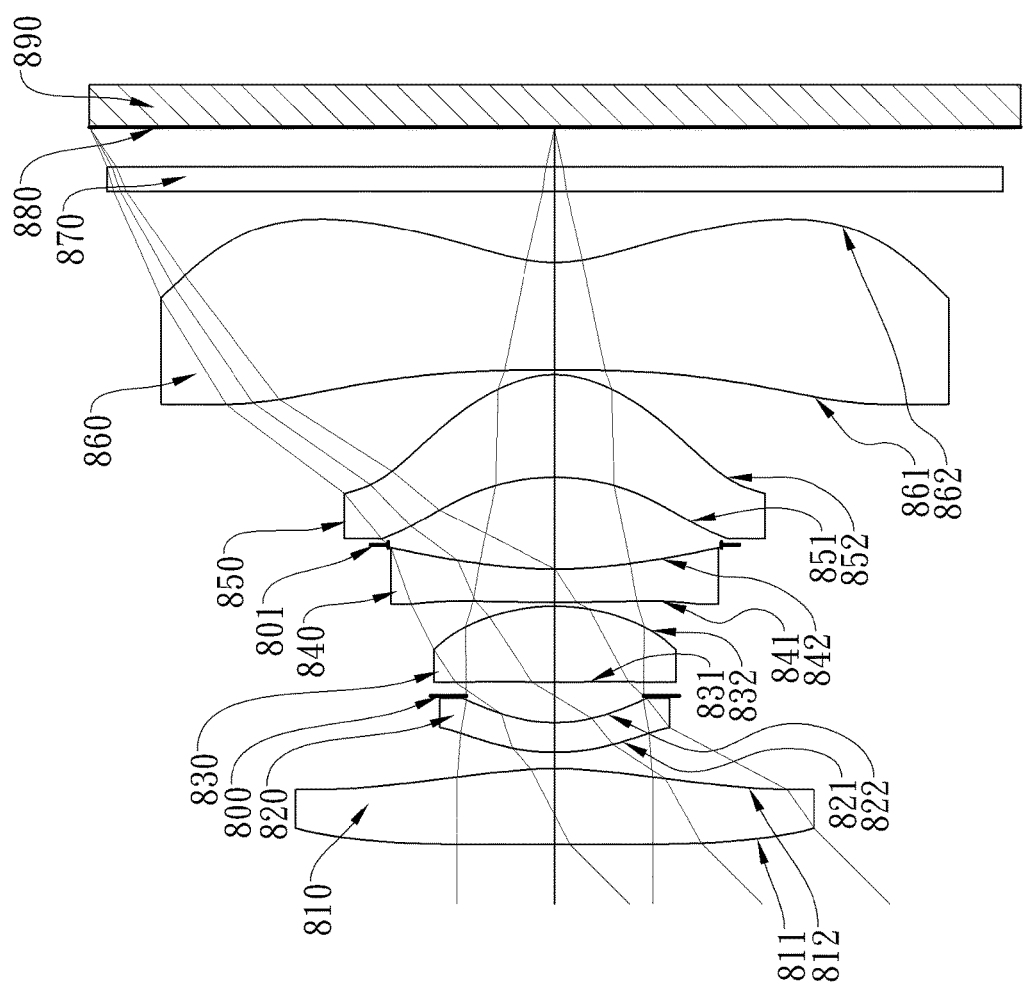
FIG. 8A is a schematic view of an image capturing apparatus according to the 8th embodiment of the present disclosure.
Figure 8B:
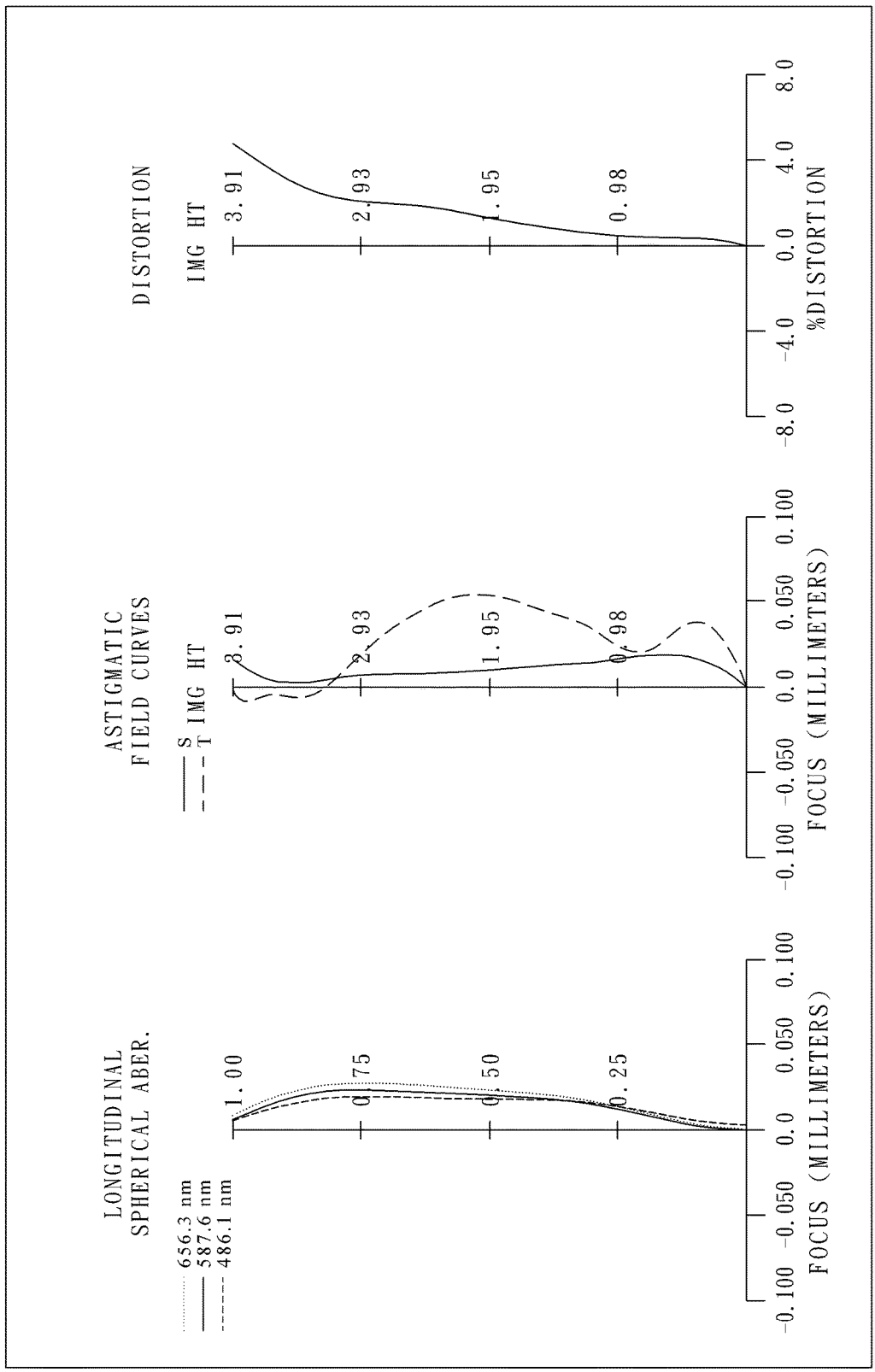
FIG. 8B shows longitudinal spherical aberration curves, astigmatic field curves and a distortion curve of the image capturing apparatus according to the 8th embodiment.

FIG. 8A is a schematic view of an image capturing apparatus according to the 8th embodiment of the present disclosure. FIG. 8B shows, in order from left to right, longitudinal spherical aberration curves, astigmatic field curves and a distortion curve of the image capturing apparatus according to the 8th embodiment.

In FIG. 8A, the image capturing apparatus includes an optical imaging lens (not otherwise herein labeled) of the present disclosure and an image sensor 890. The optical imaging lens includes, in order from an object side to an image side, a first lens element 810, a second lens element 820, an aperture stop 800, a third lens element 830, a fourth lens element 840, a stop 801, a fifth lens element 850 and a sixth lens element 860.

The first lens element 810 with positive refractive power has an object-side surface 811 being concave in a paraxial region thereof, an image-side surface 812 being convex in a paraxial region thereof, both the object-side surface 811 and the image-side surface 812 being aspheric, and at least one concave shape in an off-axial region on the image-side surface 812. The first lens element 810 is made of plastic material.

The second lens element 820 with negative refractive power has an object-side surface 821 being convex in a paraxial region thereof, an image-side surface 822 being concave in a paraxial region thereof, and both the object-side surface 821 and the image-side surface 822 being aspheric. The second lens element 820 is made of plastic material.

The third lens element 830 with positive refractive power has an object-side surface 831 being convex in a paraxial region thereof, an image-side surface 832 being convex in a paraxial region thereof, and both the object-side surface 831 and the image-side surface 832 being aspheric. The third lens element 830 is made of plastic material.

The fourth lens element 840 with negative refractive power has an object-side surface 841 being convex in a paraxial region thereof, an image-side surface 842 being concave in a paraxial region thereof, and both the object-side surface 841 and the image-side surface 842 being aspheric. The fourth lens element 840 is made of plastic material.

The fifth lens element 850 with positive refractive power has an object-side surface 851 being concave in a paraxial region thereof, an image-side surface 852 being convex in a paraxial region thereof, and both the object-side surface 851 and the image-side surface 852 being aspheric The fifth lens element 850 is made of plastic material.

The sixth lens element 860 with negative refractive power has an object-side surface 861 being concave in a paraxial region thereof, an image-side surface 862 being concave in a paraxial region thereof, both the object-side surface 861 and the image-side surface 862 being aspheric, and at least one convex shape in an off-axial region on the image-side surface 862. The sixth lens element 860 is made of plastic material.

The optical imaging lens further includes an IR cut filter 870 located between the sixth lens element 860 and an image surface 880. The IR cut filter 870 is made of glass material and will not affect the focal length of the optical imaging lens. The image sensor 890 is disposed on or near the image surface 880 of the optical imaging lens.

The detailed optical data of the 8th embodiment are shown in TABLE 21, and the aspheric surface data are shown in TABLE 22, wherein the units of the curvature radius, the thickness and the focal length are expressed in mm, and HFOV is a half of the maximal field of view.

TABLE 21

(8th Embodiment)
f = 3.71 mm, Fno = 2.25, HFOV = 45.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −117.607 | ASP | 0.644 | Plastic | 1.544 | 55.9 | 5.96 |
| 2 | | −3.162 | ASP | 0.136 | | | | |
| 3 | Lens 2 | 1.756 | ASP | 0.250 | Plastic | 1.639 | 23.5 | −8.64 |
| 4 | | 1.258 | ASP | 0.227 | | | | |
| 5 | Ape. Stop | Plano | | 0.115 | | | | |
| 6 | Lens 3 | 33.735 | ASP | 0.636 | Plastic | 1.544 | 55.9 | 3.07 |
| 7 | | −1.748 | ASP | 0.032 | | | | |
| 8 | Lens 4 | 13.065 | ASP | 0.279 | Plastic | 1.639 | 23.5 | −7.53 |
| 9 | | 3.486 | ASP | 0.204 | | | | |
| 10 | Stop | Plano | | 0.573 | | | | |
| 11 | Lens 5 | −1.922 | ASP | 0.863 | Plastic | 1.544 | 55.9 | 2.26 |
| 12 | | −0.870 | ASP | 0.040 | | | | |
| 13 | Lens 6 | −28.074 | ASP | 0.902 | Plastic | 1.566 | 41.0 | −2.01 |
| 14 | | 1.199 | ASP | 0.600 | | | | |
| 15 | IR Cut Filter | Plano | | 0.210 | Glass | 1.517 | 64.2 | — |
| 16 | | Plano | | 0.331 | | | | |
| 17 | Image Surface | Plano | | — | | | | |

Note:
Reference wavelength is d-line 587.6 nm
The effective radius of Surface 10 is 1.400 mm.

TABLE 22

Aspheric Coefficients

| Surface # | 1 | 2 | 3 | 4 |
|---|---|---|---|---|
| k = | −6.3058E+01 | −4.1638E+01 | −2.4642E+00 | −3.7298E+00 |
| A4 = | 1.2587E−02 | 4.9053E−03 | 3.2890E−02 | 3.4134E−02 |
| A6 = | −4.0157E−03 | −5.6421E−04 | −9.6933E−02 | 1.8788E−02 |
| A8 = | 1.2648E−03 | 2.7012E−04 | 4.9910E−02 | −1.0751E−01 |
| A10 = | −2.1390E−04 | −8.5196E−05 | −1.6526E−02 | 9.0480E−02 |
| A12 = | 1.5554E−05 | 1.0823E−05 | −1.3470E−02 | |

| Surface # | 6 | 7 | 8 | 9 |
|---|---|---|---|---|
| k = | −8.9383E+01 | −1.2071E+00 | −9.9323E+00 | −4.8355E+01 |
| A4 = | −2.8861E−02 | −3.1538E−02 | −7.7521E−02 | 3.4844E−02 |
| A6 = | 8.0538E−03 | 9.8648E−03 | 1.4556E−01 | −4.4998E−02 |
| A8 = | −2.7700E−02 | −6.1191E−02 | −1.9921E−01 | 6.7670E−02 |
| A10 = | 1.7709E−02 | 2.1055E−02 | 1.4303E−01 | −7.5492E−02 |
| A12 = | 1.0099E−03 | 1.5287E−03 | −5.2120E−02 | 4.8895E−02 |
| A14 = | 1.2341E−02 | −6.1325E−03 | 7.3600E−03 | −1.6220E−02 |
| A16 = | | | | 2.1329E−03 |

| Surface # | 11 | 12 | 13 | 14 |
|---|---|---|---|---|
| k = | −2.0108E+00 | −3.8716E+00 | 3.2796E+00 | −7.8734E+00 |
| A4 = | −7.7927E−02 | −2.6133E−01 | −2.8421E−02 | −3.1158E−02 |
| A6 = | 2.3151E−02 | 2.7324E−01 | 1.4022E−02 | 8.4452E−03 |
| A8 = | −2.6787E−02 | −2.3096E−01 | −4.4338E−03 | −1.7797E−03 |
| A10 = | 6.9210E−02 | 1.2946E−01 | 8.5624E−04 | 2.3879E−04 |
| A12 = | −5.1915E−02 | −3.9341E−02 | −9.3401E−05 | −2.1595E−05 |
| A14 = | 1.7217E−02 | 5.9379E−03 | 5.3214E−06 | 1.1714E−06 |
| A16 = | −2.2726E−03 | −3.5192E−04 | −1.2390E−07 | −2.7276E−08 |

In the 8th embodiment, the equation of the aspheric surface profiles of the aforementioned lens elements is the same as the equation of the 1st embodiment. Also, the definitions of these parameters shown in TABLE 23 below are the same as those stated in the 1st embodiment with corresponding values for the 8th embodiment, so an explanation in this regard will not be provided again.

Moreover, these parameters can be calculated from TABLE 21 and TABLE 22 and satisfy the conditions stated in TABLE 23.

TABLE 23

| 8th Embodiment | | | |
|---|---|---|---|
| f [mm] | 3.71 | f1/R1 | −0.05 |
| f/EPD | 2.25 | |f1|/R2 | −1.88 |
| HFOV [deg.] | 45.0 | f3/f1 | 0.52 |
| T45/T56 | 19.43 | f3/f2 | −0.36 |
| Td/ΣCT | 1.37 | |f4/f3| | 2.45 |
| TL/ImgH | 1.55 | f/ImgH | 0.95 |
| Y11/Y31 | 2.61 | f/R2 | −1.17 |
| R2/R5 | −0.09 | f/f1 | 0.62 |
| R3/R4 | 1.40 | f/f2 | −0.43 |
| R9/R10 | 2.21 | | |

The foregoing description, for purpose of explanation, has been described with reference to specific embodiments. It is to be noted that TABLES 1-23 show different data of the different embodiments; however, the data of the different embodiments are obtained from experiments. The embodiments were chosen and described in order to best explain the principles of the disclosure and its practical applications, and thereby to enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens, comprising, in order from an object side to an image side:
a first lens element with positive refractive power having an image-side surface being convex in a paraxial region thereof;

a second lens element having an image-side surface being concave in a paraxial region thereof;
a third lens element having positive refractive power;
a fourth lens element having an image-side surface being concave in a paraxial region thereof;
a fifth lens element with positive refractive power having an object-side surface being concave in a paraxial region thereof and an image-side surface being convex in a paraxial region thereof; and
a sixth lens element having an image-side surface being concave in a paraxial region thereof, at least one convex shape in an off-axial region on the image-side surface, and the image-side surface thereof being aspheric,
wherein the optical imaging lens has a total of six lens elements; each of the first lens element, the second lens element, the third lens element, the fourth lens element, the fifth lens element and the sixth lens element is a non-cemented single lens element; a focal length of the first lens element is f1, a focal length of the second lens element is f2, a focal length of the third lens element is f3, a curvature radius of the image-side surface of the first lens element is R2, an axial distance between an object-side surface of the first lens element and an image surface is TL, a maximum image height of the optical imaging lens is ImgH, and the following conditions are satisfied:

$0<f3/f1<1.50$;

$-0.70<f3/f2<1.0$;

$-100<|f1|/R2<-0.65$; and $TL/ImgH<1.64$.

2. The optical imaging lens of claim 1, wherein the focal length of the first lens element is f1, the focal length of the third lens element is f3, and the following condition is satisfied:

$0<f3/f1<0.90$.

3. The optical imaging lens of claim 1, wherein a focal length of the optical imaging lens is f, the focal length of the first lens element is f1, the focal length of the second lens element is f2, and the following conditions are satisfied:

$0<f/f1<0.75$;

$-0.50<f/f2<0.50$.

4. The optical imaging lens of claim 1, wherein the focal length of the first lens element is f1, a curvature radius of an object-side surface of the first lens element is R1, and the following condition is satisfied:

$f1/R1<0.50$.

5. The optical imaging lens of claim 1, wherein a curvature radius of the object-side surface of the fifth lens element is R9, a curvature radius of the image-side surface of the fifth lens element is R10, and the following condition is satisfied:

$1.25<R9/R10$.

6. The optical imaging lens of claim 1, wherein an axial distance between the fourth lens element and the fifth lens element is T45, an axial distance between the fifth lens element and the sixth lens element is T56, and the following condition is satisfied:

$1.75<T45/T56$.

7. The optical imaging lens of claim 1, wherein the first lens element has at least one concave shape in an off axial region on the image-side surface thereof.

8. The optical imaging lens of claim 1, wherein the fourth lens element has a negative refractive power.

9. The optical imaging lens of claim 1, wherein a focal length of the optical imaging lens is f, the curvature radius of the image-side surface of the first lens element is R2, and the following condition is satisfied:

$-2.5<f/R2<-0.50$.

10. The optical imaging lens of claim 1, wherein a curvature radius of an object-side surface of the second lens element is R3, a curvature radius of an image-side surface of the second lens element is R4, and the following condition is satisfied:

$1.0<R3/R4<2.0$.

11. The optical imaging lens of claim 1, wherein the curvature radius of the image-side surface of the first lens element is R2, a curvature radius of an object-side surface of the third lens element is R5, and the following condition is satisfied:

$-1.5<R2/R5<1.0$.

12. The optical imaging lens of claim 1, wherein a vertical distance between a maximum effective diameter position on an object-side surface of the first lens element and an optical axis is Y11, a vertical distance between a maximum effective diameter position on an object-side surface of the third lens element and the optical axis is Y31, and the following condition is satisfied:

$2.0<Y11/Y31<4.0$.

13. The optical imaging lens of claim 1, wherein a focal length of the optical imaging lens is f, a maximum image height of the optical imaging lens is ImgH, and the following condition is satisfied:

$0.5<f/ImgH<1.05$.

14. The optical imaging lens of claim 1, wherein the focal length of the first lens element is f1, the curvature radius of the image-side surface of the first lens element is R2, and the following condition is satisfied:

$-50<|f1|/R2<-1.0$.

15. The optical imaging lens of claim 14, wherein the focal length of the first lens element is f1, the curvature radius of the image-side surface of the first lens element is R2, and the following condition is satisfied:

$-25<|f1|/R2<-1.25$.

16. The optical imaging lens of claim 15, wherein the focal length of the first lens element is f1, the curvature radius of the image-side surface of the first lens element is R2, and the following condition is satisfied:

$-7.5<|f1|/R2<-1.35$.

17. The optical imaging lens of claim 1, wherein an axial distance between an object-side surface of the first lens element and the image-side surface of the sixth lens element is Td, a sum of central thicknesses of the first lens element, the second lens element, the third lens element, the fourth lens element, the fifth lens element, and the sixth lens element is $\Sigma CT$, and the following condition is satisfied:

$1.10<Td/\Sigma CT<1.40$.

18. The optical imaging lens of claim 1, wherein the focal length of the third lens element is f3, a focal length of the fourth lens element is f4, and the following condition is satisfied:

$1.40<|f4/f3|<5.0$.

19. An image capturing apparatus, comprising the optical imaging lens of claim 1 and an image sensor disposed on an image surface of the optical imaging lens.

20. An electronic device, comprising the image capturing apparatus of claim 19.

21. An optical imaging lens, comprising, in order from an object side to an image side:
  a first lens element with positive refractive power having an image-side surface being convex in a paraxial region thereof;
  a second lens element;
  a third lens element having positive refractive power;
  a fourth lens element having an image-side surface being concave in a paraxial region thereof;
  a fifth lens element with positive refractive power having an object-side surface being concave in a paraxial region thereof and an image-side surface being convex in a paraxial region thereof; and
  a sixth lens element having an image-side surface being concave in a paraxial region thereof, at least one convex shape in an off-axial region on the image-side surface, and the image-side surface thereof being aspheric,
  wherein the optical imaging lens has a total of six lens elements; each of the first lens element, the second lens element, the third lens element, the fourth lens element, the fifth lens element and the sixth lens element is a non-cemented single lens element; a focal length of the optical imaging lens is f, a focal length of the first lens element is f1, a focal length of the second lens element is f2, a focal length of the third lens element is f3, a curvature radius of the image-side surface of the first lens element is R2, and the following condition is satisfied:

$0<f3/f1<1.50$;

$-0.70<f3/f2<1.0$;

$-100<|f1|/R2<-0.65$; and $-2.5<f/R2<-0.64$.

22. The optical imaging lens of claim 21, wherein the focal length of the first lens element is f1, the focal length of the third lens element is f3, and the following condition is satisfied:

$0<f3/f1<0.90$.

23. The optical imaging lens of claim 21, wherein a focal length of the optical imaging lens is f, the focal length of the first lens element is f1, the focal length of the second lens element is f2, and the following conditions are satisfied:

$0<f/f1<0.75$;

$-0.50<f/f2<0.50$.

24. The optical imaging lens of claim 21, wherein the focal length of the first lens element is f1, a curvature radius of an object-side surface of the first lens element is R1, and the following condition is satisfied:

$f1/R1<0.50$.

25. The optical imaging lens of claim 21, wherein a curvature radius of the object-side surface of the fifth lens element is R9, a curvature radius of the image-side surface of the fifth lens element is R10, and the following condition is satisfied:

$1.25<R9/R10$.

26. The optical imaging lens of claim 21, wherein an axial distance between an object-side surface of the first lens element and an image surface is TL, a maximum image height of the optical imaging lens is ImgH, and the following condition is satisfied:

$TL/ImgH<1.80$.

27. The optical imaging lens of claim 21, wherein the first lens element has at least one concave shape in an off axial region on the image-side surface thereof.

28. The optical imaging lens of claim 21, wherein the fourth lens element has a negative refractive power.

29. The optical imaging lens of claim 21, wherein a curvature radius of an object-side surface of the second lens element is R3, a curvature radius of an image-side surface of the second lens element is R4, and the following condition is satisfied:

$1.0<R3/R4<2.0$.

30. The optical imaging lens of claim 21, wherein the curvature radius of the image-side surface of the first lens element is R2, a curvature radius of an object-side surface of the third lens element is R5, and the following condition is satisfied:

$-1.5<R2/R5<1.0$.

31. The optical imaging lens of claim 21, wherein a vertical distance between a maximum effective diameter position on an object-side surface of the first lens element and an optical axis is Y11, a vertical distance between a maximum effective diameter position on an object-side surface of the third lens element and the optical axis is Y31, and the following condition is satisfied:

$2.0<Y11/Y31<4.0$.

32. The optical imaging lens of claim 21, wherein a focal length of the optical imaging lens is f, a maximum image height of the optical imaging lens is ImgH, and the following condition is satisfied:

$0.5<f/ImgH<1.05$.

33. The optical imaging lens of claim 21, wherein the focal length of the first lens element is f1, the curvature radius of the image-side surface of the first lens element is R2, and the following condition is satisfied:

$-50<|f1|/R2<-1.0$.

34. The optical imaging lens of claim 33, wherein the focal length of the first lens element is f1, the curvature radius of the image-side surface of the first lens element is R2, and the following condition is satisfied:

$-25<|f1|/R2<-1.25$.

35. The optical imaging lens of claim 34, wherein the focal length of the first lens element is f1, the curvature radius of the image-side surface of the first lens element is R2, and the following condition is satisfied:

$-7.5<|f1|/R2<-1.35$.

36. The optical imaging lens of claim 21, wherein an axial distance between an object-side surface of the first lens element and the image-side surface of the sixth lens element is Td, a sum of central thicknesses of the first lens element, the second lens element, the third lens element, the fourth lens element, the fifth lens element, and the sixth lens element is ΣCT, and the following condition is satisfied:

$1.10 < Td/\Sigma CT < 1.40$.

37. The optical imaging lens of claim 21, wherein the focal length of the third lens element is f3, a focal length of the fourth lens element is f4, and the following condition is satisfied:

$1.40 < |f1/f3| < 0.65$.

38. An image capturing apparatus, comprising the optical imaging lens of claim 21 and an image sensor disposed on an image surface of the optical imaging lens.

39. An electronic device, comprising the image capturing apparatus of claim 38.

40. The optical imaging lens of claim 21, wherein an axial distance between the fourth lens element and the fifth lens element is T45, an axial distance between the fifth lens element and the sixth element is T56, and the following condition is satisfied:

$1.75 < T45/T56$.

* * * * *